US007199938B2

(12) United States Patent
Fujimoto et al.

(10) Patent No.: US 7,199,938 B2
(45) Date of Patent: Apr. 3, 2007

(54) IMMERSION OBJECTIVE LENS SYSTEM FOR MICROSCOPE

(75) Inventors: Yasushi Fujimoto, Hino (JP); Takashi Kasahara, Tachikawa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/330,349

(22) Filed: Jan. 12, 2006

(65) Prior Publication Data

US 2006/0203354 A1    Sep. 14, 2006

(30) Foreign Application Priority Data

Jan. 13, 2005 (JP) ............................. 2005-006032
Oct. 25, 2005 (JP) ............................. 2005-309180

(51) Int. Cl.
*G02B 21/02* (2006.01)

(52) U.S. Cl. ..................................................... 359/656

(58) Field of Classification Search ........ 359/643–647, 359/656–659
See application file for complete search history.

(56) References Cited

U.S. PATENT DOCUMENTS 3,746,428 A * 7/1973 Shoemaker ................. 359/657
5,502,596 A * 3/1996 Suzuki ....................... 359/657
5,517,360 A * 5/1996 Suzuki ....................... 359/658

FOREIGN PATENT DOCUMENTS

| JP | 3318060 | 2/1995 |
| JP | 3457992 | 10/1995 |
| JP | 2002-098903 A | 4/2002 |
| JP | 2002-350734 A | 12/2002 |
| JP | 2003-015046 A | 1/2003 |
| JP | 2003-021786 A | 1/2003 |
| JP | 2003-233012 A | 8/2003 |
| JP | 2004-522185 A | 7/2004 |

* cited by examiner

*Primary Examiner*—Ricky Mack
*Assistant Examiner*—M. Hasan
(74) *Attorney, Agent, or Firm*—Kenyon & Kenyon LLP

(57) ABSTRACT

An apochromat immersion objective lens system for microscope which consists, in order from the object side, of a first lens unit composed of a cemented lens component consisting of a plano-convex lens element having a planar surface on the object side and a meniscus lens element having a concave surface on the object side, a second lens unit composed of a lens component or two lens components, a third lens unit comprising at least two cemented lens components, a fourth lens unit composed of a negative lens component having a strongly concave surface on the image side and a fifth lens unit comprising a meniscus lens component having a concave surface on the object side, and has a large numerical aperture exceeding 1.4 without using special oil or a special cover glass plate as well as favorably corrected spherical aberration and chromatic aberration.

5 Claims, 16 Drawing Sheets

IMMERSION OBJECTIVE LENS SYSTEM FOR MICROSCOPE

The present invention relates to an objective lens system for microscope, and more specifically to an immersion objective lens system for microscope which has a large numerical aperture exceeding 1.4 and apochromatic performance.

In recent years, movements and activities in cells of living bodies have been observed in a field of biology using total internal reflection fluorescence microscopy (hereinafter abbreviated as TIRFM). Since it is necessary for observation by TIRFM to totally reflect illumination light on a boundary surface between a cover glass plate and a specimen, it is required to use an objective lens system which has a large numerical aperture (NA) large enough to allow light to be totally reflected on a surface of a sample of a living body.

Furthermore, it is demanded to reduce a oozing depth of evanescent light for observation with little background noise by the above described observation method.

In order to meet such a requirement, it is desired to enlarge an NA of an objective lens system, or to obtain an objective lens system which has an NA exceeding 1.4.

As conventional examples of an objective lens system which has an NA exceeding 1.4, there are known objective lens system describes in the following official bulletins:

Official bulletin of Japanese Patent No. 3457992 (Kokai Application No. Hei 7-282097)
Japanese Patent Kokai Publication No. 2002-098903
Japanese Patent Kokai Publication No. 2002-350734
Japanese Patent Kokai Publication No. 2003-021786
Japanese Patent Kokai Publication No. 2003-233012
Japanese Patent Kokai Publication No. 2004-522185
Japanese Patent Kokai Publication No. 2003-015046

Out of the objective lens system described in these official bulletins, the objective lens systems which are described in the official bulletin of Japanese Patent No. 3457992 and Japanese Patent Kokai Application No. 2003-233012 use oil having a refractive index nd of 1.78035 and a cover glass plate having a refractive index nd of 1.7865, and have a magnification of 100× and a numerical aperture NA of 1.65.

Furthermore, the objective lens system which is described in Japanese Patent Kokai Publication No. 2002-098903 uses oil having a refractive index nd of 1.80711 and a cover glass plate having a refractive index nd of 1.804, and has a magnification of 100× and a numerical aperture NA of 1.65 to 1.67.

Furthermore, the objective lens systems which are described in Japanese Patent Kokai Publication No. 2002-350734 are an objective lens system having a magnification of 60× and a numerical aperture NA of 1.45 and an objective lens system having a magnification of 100× and a numerical aperture NA of 1.45 to 1.46.

Furthermore, the objective lens systems described in Japanese Patent Kokai Publication No. 2003-021786 and Japanese Patent Kokai Publication No. 2004-522185 have a magnification of 100× and a numerical aperture NA of 1.45.

Furthermore, the objective lens system described in Japanese Patent Kokai Application No. 2003-015046 has magnifications of 55.9× and 59.6×, and a numerical aperture NA of 1.4, whereas an objective lens system which is usable in an illumination system has a numerical aperture of 1.46.

SUMMARY OF THE INVENTION

An abject of the present invention is to provide an apochromat immersion objective lens system for microscope which has a large numerical aperture exceeding 1.4 without using special oil or a cover glass plate, and in which spherical aberration and chromatic aberration are favorably corrected.

Speaking more concretely, an object of the present invention is to provide an immersion objective lens system for microscope which consists, in order from the object side, of a lens unit composed of a cemented lens component consisting of a plano convex lens element having a planar surface on the object side and a meniscus lens element having a concave surface on the object side, a second lens unit composed of a lens component or two lens components, a third lens unit comprising at least two cemented lens components, a fourth lens unit composed of a negative lens component having a strongly concave surface on the image side and a fifth lens unit comprising a meniscus lens component having a concave surface on the object side, and satisfies the following condition (1):

$$0.9 \leq |f12/f| \leq 1.3 \tag{1}$$

wherein a reference symbol f12 represents a total focal length of the first lens unit and the second lens unit, and a reference symbol f designates a focal length of the objective lens system as a whole.

Another object of the present invention is to provide an immersion objective lens system for microscope which is the same as the above described objective lens system and additionally satisfies the following conditions (2) and (3):

$$0.7 \leq |R12/R13| \leq 1.4 \tag{2}$$

$$0.7 \leq |R12/f| \leq 1.3 \tag{3}$$

wherein a reference symbol R12 represents a radius of curvature on a cemented surface of the first lens unit, a reference symbol R13 designates a radius of curvature on an image side surface of the first lens-unit and a reference symbol f denotes a focal length of the objective lens system as a whole.

Still another object of the present invention is to provide an objective lens system for microscope which has a second composition described below, or consists, in order from the object side, of a first lens unit composed of a cemented lens component consisting of a plano-convex lens element and a meniscus lens element having a concave surface on the object side, and a meniscus lens component, a second lens unit comprising a plurality of cemented lens components and having positive refractive power, a third lens unit which comprises a plurality of cemented meniscus lens components having concave surfaces on the image side and has positive refractive power and a fourth lens unit comprising a meniscus lens component having a concave surface or more meniscus lens components having concave surfaces on the object side, and satisfies the following conditions (4), (5) and (6):

$$5 < f_3/f < 100 \tag{4}$$

$$n_d(n) - n_d(p) < 0.2 \tag{5}$$

$$\nu(p) - \nu(n) > 35 \tag{6}$$

wherein a reference symbol $f_3$ represents a focal length of the third lens unit, a reference symbol f designates a focal length of the objective lens system as a whole, reference symbol $n_d(n)$ and $n_d(p)$ denote refractive indices for the d-line of a negative lens element and a positive lens element respectively which compose each of the plurality of cemented lens components in the third lens unit, and reference symbols $\nu(p)$ and $\nu(n)$ represent Abbe's numbers of the positive lens element and the negative lens element respectively which compose each of the cemented lens components in the third lens unit.

Further another object of the present invention is to provide an objective lens system for microscope which has the second composition and satisfies the following condition (7):

$$0.7 < R_1/R_2 < 2 \qquad (7)$$

wherein reference symbols $R_1$ and $R_2$ represent radii of curvature on an object side surface and an image side surface respectively of the meniscus cemented lens component having the concave surface on the object side in the first lens unit.

Further another object of the present invention is to provide an objective lens system for microscope which comprises a cemented lens component movable along an optical axis and having weak negative refractive power in a second lens unit, and satisfies the following condition (8):

$$|f(G_2A)/f| > 100 \qquad (8)$$

wherein a reference symbol f ($G_2A$) represents a focal length of the cemented lens component movable in the second lens unit.

DETAILED DESCRIPTION OF THE PREFERRED EMBODIMENTS

Figure 1:
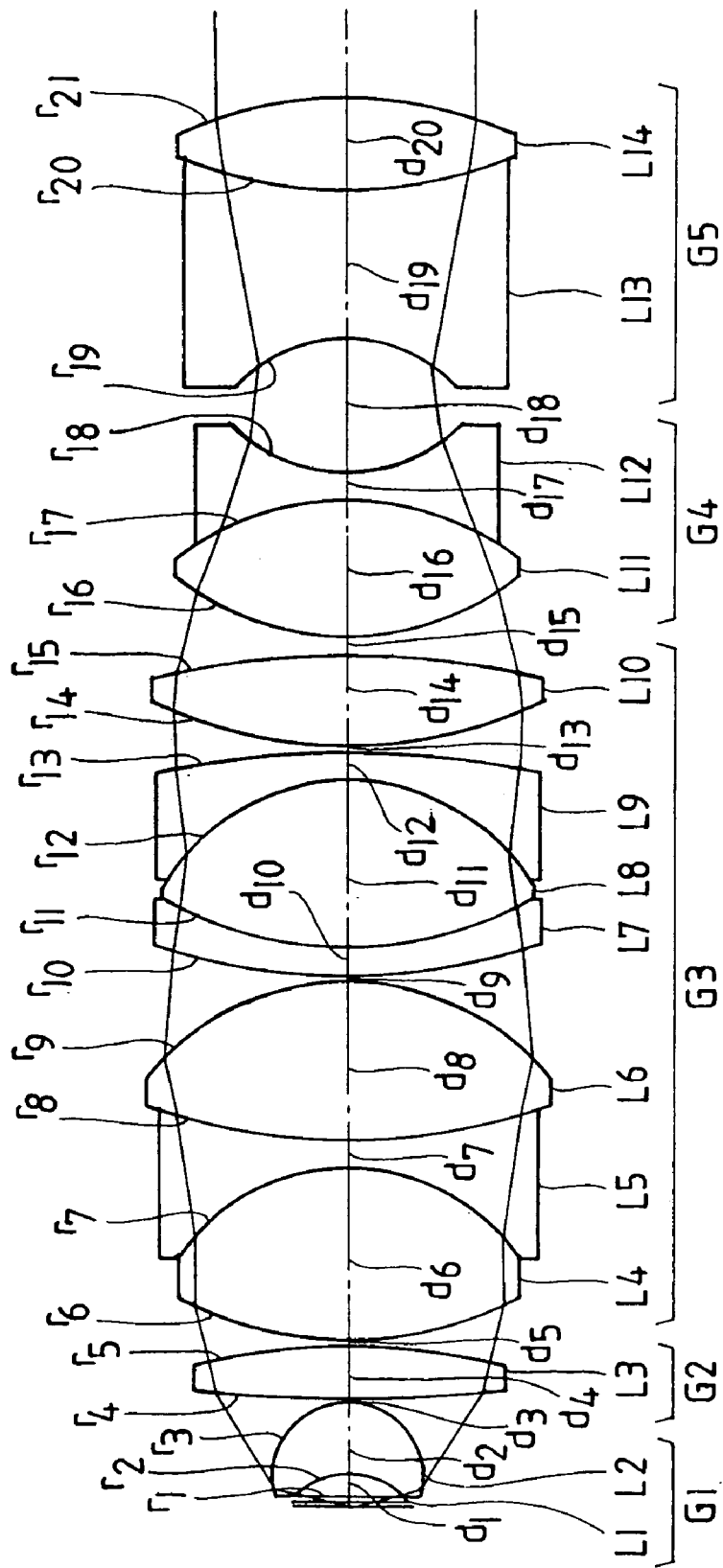
FIG. 1 is a sectional view of an objective lens system according to a first embodiment of the present invention.

An objective lens system which has a first composition according to the present invention consists, in order from the object side, of first lens unit composed of a cemented lens component consisting of a plano-convex lens element having a planar surface on the object side and a meniscus lens element having a concave surface on the object side, a second lens unit composed of one lens component or two lens components, a third lens unit comprising at least two cemented lens components, a fourth lens unit composed of a negative lens component having a strongly concave surface on the image side and a fifth lens unit comprising a meniscus lens component having a concave surface on the object side, and satisfies the following condition (1):

$$0.9 \leq |f12/f| \leq 1.3 \qquad (1)$$

wherein a reference symbol f12 represents a total focal length of the first lens unit and the second lens unit, and a reference symbol f designates a focal length of the objective lens system as a whole.

Furthermore, an objective lens system according to the present invention has the above described composition and satisfies, in addition to the condition (1), the following conditions (2) and (3):

$$0.7 \leq |R12/R13| \leq 1.4 \qquad (2)$$

$$0.7 \leq |R12/f| \leq 1.3 \qquad (3)$$

wherein a reference symbol R12 represents a radius of curvature on a cemented surface of the first lens unit and a reference symbol R13 designates a radius of curvature on an image side surface of the first lens unit.

The objective lens system which has the first composition according to the present invention is configured to correct a Petzval's sum by composing the first lens unit of the cemented lens component consisting of the plano-convex lens element and the meniscus lens element having the concave surface on the object side, configuring a cemented surface as a surface concave on the object side and imparting negative refractive power to this cemented surface.

It is general that a principal ray passes though the meniscus lens element on the image side of a center line which intersects perpendicularly with an optical axis, but in the objective lens system according to the present invention which has a large NA, a principal ray passes through the meniscus lens element in the vicinity of the above described center line or on the object side of the center line. Accordingly, this convex surface is configured so as to have curvature which satisfies the condition of aplanatism, thereby suppressing production of spherical aberration and coma in the objective lens system according to the present invention.

Furthermore, the second lens unit which has positive refractive power is configured to lead rays to the third lens unit after reducing divergence of the rays. The second lens unit must therefore comprise one positive lens component or two positive lens components. Furthermore, it is desirable to configure these lens elements as meniscus lens elements having concave surfaces on the object side, plano-convex lens element having planar surfaces on the object side or biconvex lens elements.

Furthermore, the third lens unit is configured to have a composition comprising at least the two cemented lens components for correcting spherical aberration and chromatic aberration. For an apochromat objective lens system which has a large NA like the objective lens system according to the present invention, it is more desirable to use a cemented lens component consisting of three lens elements in a third lens unit.

Furthermore, the fourth lens unit is composed of the negative lens component which has the strongly concave surface on the image side. This negative lens component has strong negative refractive power, thereby being capable of correcting not only a Petzval's sum but also spherical aberration and coma. For more favorable correction of chromatic aberration, it is desirable to configure this negative lens component as a cemented lens component consisting of a positive lens element and a negative lens element.

Furthermore, the fifth lens unit has a composition which comprises the meniscus lens component having the concave surface on the object side.

The fifth lens unit favorably correct not only a Petzval's sum but also aberrations with negative refractive power of the concave surface on the object side. The meniscus lens component comprised in the fifth lens unit has a function to adjust heights and angles of rays emerging from the objective lens system. Furthermore, it is desirable to configure this meniscus lens component as a cemented lens component which consists of a positive lens element and a negative lens element, and is capable of correcting lateral chromatic aberration.

Furthermore, the objective lens system for microscope according to the present invention is configured to satisfy the above-mentioned condition (1) so that the objective lens system has a large NA exceeding 1.46.

The condition (1) defines the total focal length f12 of the first lens unit and the second lens unit. The objective lens system is configured to satisfy the condition (1) so that total positive refractive power of the first lens unit and the second lens unit is stronger than that of the conventional objective lens systems. Spherical aberration and longitudinal chromatic aberration increase as heights of rays are enhanced. Total refractive power of the first lens unit and the second lens unit of the objective lens system according to the present invention is therefore strengthened to lower heights of rays incident on the third lens unit, whereby the objective lens system according to the present invention is capable of favorably correcting spherical aberration and longitudinal chromatic aberration even of rays which have NAs exceeding 1.46.

If |f12/f| has a value which is smaller than a lower limit of 0.9 of the condition (1), the total power of the first lens unit and the second lens unit will be too strong, thereby lowering heights of rays incident on the third lens unit. In this case, there will remain no margin to raise or lower the rays in the third and later lens units, whereby it will be difficult to correct curvature of field to a substantially preferable range.

If |f12/f| has a value which is larger than an upper limit of 1.3 of the condition (1), heights of rays incident on the third lens unit will be raised. In this case, it will be impossible to favorably correct spherical aberration and axial aberrations of rays having NA exceeding 1.46.

Each of the objective lens systems described in the official bulletins of Japanese Patent Kokai publication Nos. Hei 7-282097, 2002-098903, 2002-350734, 2003-021786, 2003-283012, 2004-522185 and 2003-015046 has a value of |f12/f| exceeding 1.4.

It is desirable that the objective lens system for microscope which has the first composition according to the present invention satisfies not only the condition (1) but also the conditions (2) and (3) for a reason described below:

The condition (2) which defines a ratio between the radius of curvature on the cemented surface in the cemented lens component and the radius of curvature on the image side surface of the first lens unit is required for capturing rays having large NA and obtaining a practical working distance.

If |R12/R13| has a value which is smaller than a lower limit of 0.7 of the condition (2), curvature on the cemented surface will be enlarged, thereby making it impossible to maintain a required effective diameter of a first surface and capture the rays having the large NA.

If |R12/R13| has a value which is larger than an upper limit of 1.4 of the condition (2), curvature on the image side convex surface of the above-mentioned cemented lens component will be enlarged. As a result, it is obliged to extremely shorten a working distance of the objective lens system for satisfying the condition of aplanatism, thereby making it difficult to obtain a practical working distance.

Furthermore, the condition (3) which defines a radio of |R12/f| between the radius of curvature R12 on the cemented surface of the first lens unit and the focal length f of the objective lens system as a whole is required for correcting aberrations with good balance.

If |R12/f| has a value which is smaller than a lower limit of 0.7 of the condition (3), curvature on the cemented surface will be enlarged, thereby aggravating spherical aberration and coma. If |R12/f| has a value which is larger than an upper limit of 1.3 of the condition (3), in contrast, curvature on the cemented surface will be reduced, whereby a Petzval's sum will be undercorrected and curvature of field will be aggravated.

Even when standard oil and a standard cover glass plate are used instead of special oil and a special cover glass plate, the objective lens system which has the first composition according to the present invention is usable as an apochromat immersion objective lens system for microscope which has a large numerical aperture NA exceeding 1.46 and in which aberrations such as spherical aberration and chromatic aberration are favorably corrected are favorably corrected.

Now, description will be made of embodiments of the objective lens system which has the first composition according to the present invention.

An immersion objective lens system according to a first embodiment of the present invention has a composition shown in FIG. 1 and numerical data which is listed below:

Magnification β = 60x, NA = 1.48, Field number 22, WD = 0.15

| | | | | |
|---|---|---|---|---|
| $r_1 = \infty$ | $d_1 = 0.8000$ | $n_1 = 1.51633$ | $v_1 = 64.14$ | L1 |
| $r_2 = -2.6547$ | $d_2 = 2.4984$ | $n_2 = 1.88300$ | $v_2 = 40.76$ | L2 |
| $r_3 = -2.5373$ | $d_3 = 0.1000$ | | | |
| $r_4 = 47.6732$ | $d_4 = 1.8000$ | $n_3 = 1.88300$ | $v_3 = 40.76$ | L3 |
| $r_5 = -22.0319$ | $d_5 = 0.2000$ | | | |
| $r_6 = 12.2714$ | $d_6 = 5.9531$ | $n_4 = 1.49700$ | $v_4 = 81.54$ | L4 |
| $r_7 = -7.0761$ | $d_7 = 1.0000$ | $n_5 = 1.73800$ | $v_5 = 32.26$ | L5 |
| $r_8 = 21.2676$ | $d_8 = 5.4885$ | $n_6 = 1.43875$ | $v_6 = 94.93$ | L6 |
| $r_9 = -8.8207$ | $d_9 = 0.2000$ | | | |
| $r_{10} = 21.2722$ | $d_{10} = 1.0000$ | $n_7 = 1.61336$ | $v_7 = 44.49$ | L7 |
| $r_{11} = 12.9696$ | $d_{11} = 5.7718$ | $n_8 = 1.43875$ | $v_8 = 94.93$ | L8 |

-continued

Magnification β = 60x, NA = 1.48, Field number 22,
WD = 0.15

| | | | | |
|---|---|---|---|---|
| $r_{12} = -7.3922$ | $d_{12} = 1.0000$ | $n_9 = 1.77250$ | $v_9 = 49.60$ | L9 |
| $r_{13} = -29.9163$ | $d_{13} = 0.2000$ | | | |
| $r_{14} = 15.5341$ | $d_{14} = 3.1803$ | $n_{10} = 1.43875$ | $v_{10} = 94.93$ | L10 |
| $r_{15} = -28.1567$ | $d_{15} = 0.6000$ | | | |
| $r_{16} = 9.2626$ | $d_{16} = 4.7832$ | $n_{11} = 1.60300$ | $v_{11} = 65.44$ | L11 |
| $r_{17} = -9.5374$ | $d_{17} = 1.0000$ | $n_{12} = 1.67300$ | $v_{12} = 38.15$ | L12 |
| $r_{18} = 5.7707$ | $d_{18} = 4.6044$ | | | |
| $r_{19} = -5.2804$ | $d_{19} = 5.1425$ | $n_{13} = 1.60300$ | $v_{13} = 65.44$ | L13 |
| $r_{20} = 14.9668$ | $d_{20} = 3.2178$ | $n_{14} = 1.71736$ | $v_{14} = 29.52$ | L14 |
| $r_{21} = -13.3762$ | | | | |

R12 = $r_2$ = −2.6547
R13 = $r_3$ = −2.5373
f = 3
f12 = 3.03
f1 = 3.65
f2 = 17.27
f3 = 15.39
f4 = −32.62
f5 = −49.87
|f12/f| = 1.01        Condition (1)
|R12/R13| = |$r_2/r_3$| = 1.05    Condition (2)
|R12/f| = |$r_2$/f| = 0.88      Condition (3)

wherein reference symbols $r_1, r_2 \ldots$ represent radii of curvature on surfaces of respective lens elements, reference symbols $d_1, d_2, \ldots$ designate thicknesses of the respective lens elements and airspaces therebetween, reference symbols $n_1, n_2 \ldots$ denote refractive indices for the d-line of the respective lens elements, and reference symbols $v_1, v_2 \ldots$ represent Abbe's numbers of the respective lens elements. Furthermore, a reference symbol β represents a magnification, a reference symbol NA designates a numerical aperture, a reference symbol f denotes a focal length of the objective lens system and a reference symbol WD represents a working distance. In addition, distances such as r and d are specified in a unit of millimeter.

The objective lens system according to the above described first embodiment of the present invention consists, as shown in FIG. 1, of a first lens unit G1, a second lens unit G2, a third lens unit G3, a fourth lens unit G4 and a fifth lens unit G5, the first lens unit G1 is composed of a cemented lens component L1, L2 ($r_1$ to $r_3$) which has a cemented surface $r_2$ concave on the object side, the second lens unit G2 is composed of a positive lens element L3 ($r_4$ to $r_5$), the third lens unit G3 has positive refractive power as a whole, and is composed of a cemented lens component which consists of three convex, concave and convex lens elements L4, L5 and L6 ($r_6$ to $r_9$), a cemented lens component which consists of three concave, convex and concave lens elements L7, L8 and L9 ($r_{10}$ to $r_{13}$) and a positive lens component L10 ($r_{14}$ to $r_{15}$), the fourth lens unit G4 has positive refractive power as a whole and is composed of a cemented meniscus lens component L11, L12 ($r_{16}$ to $r_{18}$), and the fifth lens unit G5 has negative power as a whole and is composed of a cemented meniscus lens component L13, L14 ($r_{19}$ to $r_{21}$) which has a concave surface on the object side.

The objective lens system according to the first embodiment satisfies the conditions (1), (2) and (3) as shown in the numerical data.

An objective lens system according to a second embodiment of the present invention has a composition shown in FIG. 2 and numerical data which is listed below:

Magnification β = 60x, NA = 1.48, Field number 22,
WD = 0.15

| | | | | |
|---|---|---|---|---|
| $r_1 = \infty$ | $d_1 = 0.8000$ | $n_1 = 1.51633$ | $v_1 = 64.14$ | L1 |
| $r_2 = -3.0948$ | $d_2 = 2.6875$ | $n_2 = 1.80400$ | $v_2 = 46.57$ | L2 |
| $r_3 = -2.6321$ | $d_3 = 0.1000$ | | | |
| $r_4 = \text{INF}$ | $d_4 = 1.8000$ | $n_3 = 1.75500$ | $v_3 = 52.32$ | L3 |
| $r_5 = -11.8564$ | $d_5 = 0.2000$ | | | |
| $r_6 = 14.6612$ | $d_6 = 5.8013$ | $n_4 = 1.49700$ | $v_4 = 81.54$ | L4 |
| $r_7 = -6.8647$ | $d_7 = 1.0000$ | $n_5 = 1.67300$ | $v_5 = 38.15$ | L5 |
| $r_8 = 63.6424$ | $d_8 = 5.4381$ | $n_6 = 1.43875$ | $v_6 = 94.93$ | L6 |
| $r_9 = -9.5708$ | $d_9 = 0.2000$ | | | |
| $r_{10} = 20.1407$ | $d_{10} = 1.0000$ | $n_7 = 1.61336$ | $v_7 = 44.49$ | L7 |
| $r_{11} = 10.7554$ | $d_{11} = 6.5836$ | $n_8 = 1.43875$ | $v_8 = 94.93$ | L8 |
| $r_{12} = -6.9608$ | $d_{12} = 1.0000$ | $n_9 = 1.63775$ | $v_9 = 42.41$ | L9 |
| $r_{13} = -38.7752$ | $d_{13} = 0.2000$ | | | |
| $r_{14} = 16.7280$ | $d_{14} = 1.6894$ | $n_{10} = 1.43875$ | $v_{10} = 94.93$ | L10 |
| $r_{15} = -120.5347$ | $d_{15} = 0.6000$ | | | |
| $r_{16} = 9.7467$ | $d_{16} = 4.6630$ | $n_{11} = 1.60300$ | $v_{11} = 65.44$ | L11 |
| $r_{17} = -8.0837$ | $d_{17} = 1.0000$ | $n_{12} = 1.67300$ | $v_{12} = 38.15$ | L12 |
| $r_{18} = 5.8307$ | $d_{18} = 4.6577$ | | | |
| $r_{19} = -5.2834$ | $d_{19} = 5.8611$ | $n_{13} = 1.60300$ | $v_{13} = 65.44$ | L13 |
| $r_{20} = 16.6902$ | $d_{20} = 2.9042$ | $n_{14} = 1.73800$ | $v_{14} = 32.26$ | L14 |
| $r_{21} = -13.4830$ | | | | |

R12 = $r_2$ = −3.0948
R13 = $r_3$ = −2.6321
f = 3
f12 = 3.24
f1 = 3.92
f2 = 15.7
f3 = 15.15
f4 = −27.7
f5 = −63.69
|f12/f| = 1.08        Condition (1)
|R12/R13| = |$r_2/r_3$| = 1.18    Condition (2)
|R12/f| = |$r_2$/f| = 1.03      Condition (3)

Figure 2:
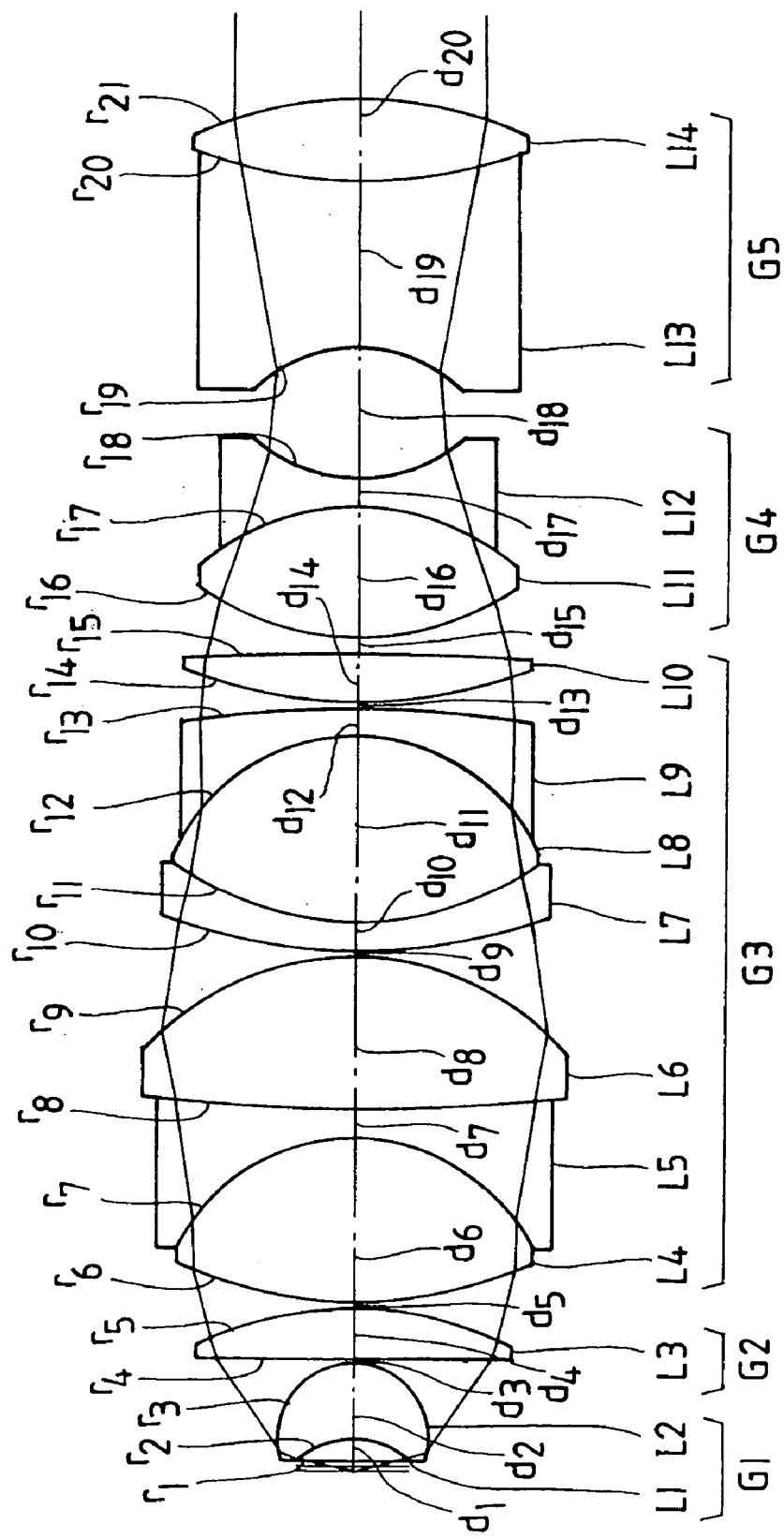
FIG. 2 is a sectional view of an objective lens system according to a second embodiment of the present invention.

An objective lens system according to the second embodiment of the present invention consists of five lens units: in order from the object side as shown in FIG. 2, a first lens unit G1, a second lens unit G2, a third lens unit G3, a fourth lens unit G4 and a fifth lens unit G5.

The first lens unit G1 has positive refractive power as a whole and is composed of a plano-convex lens component L1, L2 ($r_1$ to $r_3$) having a cemented surface $r_2$ concave on the object side, the second lens unit G2 is composed of a positive lens element L3 ($r_4$ to $r_5$), the third lens unit G3 has positive power as a whole and is composed of a cemented lens component L4, L5, L6 ($r_6$ to $r_9$) which consists of three convex, concave and convex lens elements, a cemented lens component L7, L8, L9 ($r_{10}$ to $r_{13}$) which consists of three concave, convex and concave lens elements, and a positive lens component $L_{10}$ ($r_{14}$ to $r_{15}$), the fourth lens unit G4 has negative refractive power as a whole and is composed of a cemented lens component L11, L12 ($r_{16}$ to $r_{18}$) having a concave surface on the image side, and the fifth lens unit G5 has negative power as a whole and is composed of a cemented meniscus lens component L13, L14 ($r_{19}$ to $r_{21}$) having a concave surface on the object side.

The second embodiment also satisfies the conditions (1), (2) and (3) as shown in the numerical data.

Figure 3:
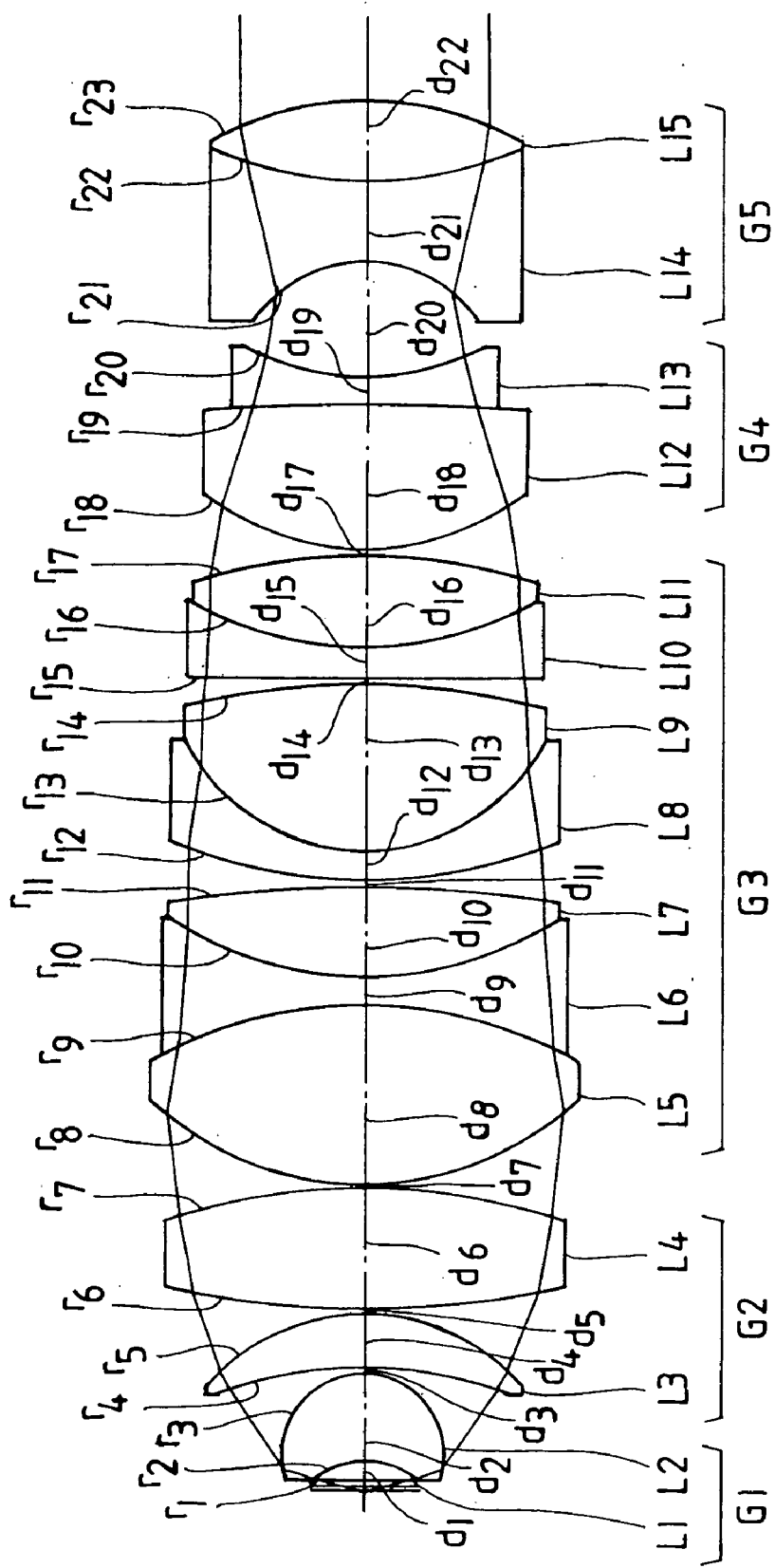
FIG. 3 is a sectional view of an objective lens system according to a third embodiment of the present invention.

An objective lens system according to the third embodiment of the present invention has a composition shown in FIG. 3 and has numerical data which is listed below:

Magnification β = 60x, NA = 1.48, Field number 22,
WD = 0.15

| | | | | |
|---|---|---|---|---|
| $r_1 = \infty$ | $d_1 = 0.7000$ | $n_1 = 1.51633$ | $v_1 = 64.14$ | L1 |
| $r_2 = -3.0558$ | $d_2 = 3.1300$ | $n_2 = 1.77250$ | $v_2 = 49.60$ | L2 |

-continued

Magnification β = 60x, NA = 1.48, Field number 22, WD = 0.15

| | | | | |
|---|---|---|---|---|
| $r_3 = -2.8215$ | $d_3 = 0.1400$ | | | |
| $r_4 = -14.6318$ | $d_4 = 1.9000$ | $n_3 = 1.56907$ | $v_3 = 71.30$ | L3 |
| $r_5 = -7.3349$ | $d_5 = 0.2000$ | | | |
| $r_6 = 31.2166$ | $d_6 = 4.2475$ | $n_4 = 1.43875$ | $v_4 = 94.93$ | L4 |
| $r_7 = -21.9219$ | $d_7 = 0.1000$ | | | |
| $r_8 = 10.8530$ | $d_8 = 6.3968$ | $n_5 = 1.43875$ | $v_5 = 94.93$ | L5 |
| $r_9 = -14.8866$ | $d_9 = 1.0000$ | $n_6 = 1.67300$ | $v_6 = 38.15$ | L6 |
| $r_{10} = 12.3589$ | $d_{10} = 3.1351$ | $n_7 = 1.43875$ | $v_7 = 94.99$ | L7 |
| $r_{11} = -46.6847$ | $d_{11} = 0.3000$ | | | |
| $r_{12} = 18.3790$ | $d_{12} = 1.0000$ | $n_8 = 1.63775$ | $v_8 = 42.41$ | L8 |
| $r_{13} = 7.1356$ | $d_{13} = 5.9316$ | $n_9 = 1.43875$ | $v_9 = 94.99$ | L9 |
| $r_{14} = -24.7148$ | $d_{14} = 0.2000$ | | | |
| $r_{15} = $ INF | $d_{15} = 1.1000$ | $n_{10} = 1.67300$ | $v_{10} = 38.15$ | L10 |
| $r_{16} = 12.6163$ | $d_{16} = 3.2446$ | $n_{11} = 1.43875$ | $v_{11} = 94.99$ | L11 |
| $r_{17} = -18.7213$ | $d_{17} = 0.2000$ | | | |
| $r_{18} = 9.0969$ | $d_{18} = 5.1442$ | $n_{12} = 1.43875$ | $v_{12} = 94.99$ | L12 |
| $r_{19} = -101.6701$ | $d_{19} = 1.0000$ | $n_{13} = 1.61336$ | $v_{13} = 44.49$ | L13 |
| $r_{20} = 8.9722$ | $d_{20} = 4.0950$ | | | |
| $r_{21} = -4.7658$ | $d_{21} = 2.7900$ | $n_{14} = 1.60300$ | $v_{14} = 65.44$ | L14 |
| $r_{22} = 13.7835$ | $d_{22} = 2.8326$ | $n_{15} = 1.73800$ | $v_{15} = 32.26$ | L15 |
| $r_{23} = -11.2491$ | | | | |

R12 = $r_2$ = −3.0558
R13 = $r_3$ = −2.8215
f = 3
f12 = 3.72
f1 = 4.34
f2 = 13.45
f3 = 25.95
f4 = −128.53
f5 = −44.9
|f12/f| = 1.24          Condition (1)
|R12/R13| = |$r_2/r_3$| = 1.08   Condition (2)
|R12/f| = |$r_2/f$| = 1.02    Condition (3)

Speaking concretely, the objective lens system according to the third embodiment consists, in order from the object side, of a first lens unit G1, a second lens unit G2, a third lens unit G3, a fourth lens unit G4 and a fifth lens unit G5.

The first lens unit G1 is composed of a plano-convex cemented lens component L1, L2 ($r_1$ to $r_3$) which has a cemented surface ($r_2$) on the object side, the second lens unit G2 is composed of two positive lens elements L3 and L4 ($r_4$ to $r_5$, $r_6$ to $r_7$), the third lens unit G3 has positive refractive power as a whole, and is composed of a cemented lens component which consists of three convex, concave and convex lens elements L5, L6, L7 ($r_8$ to $r_{11}$), a cemented lens component consisting of concave and convex lens elements L8, L9 ($r_{12}$ to $r_{14}$) and a cemented lens component consisting of concave and convex lens elements L10, L11 ($r_{15}$ to $r_{17}$), the fourth lens unit G4 has negative refractive power as a whole and is composed of a cemented meniscus lens component L12, L13 ($r_{18}$ to $r_{20}$) having a concave surface on the image side, and the fifth lens unit G5 has negative refractive power as a whole and is composed of a cemented meniscus lens component L14, L15 ($r_{21}$ to $r_{23}$) which has a concave surface on the object side.

The third embodiment also satisfies the conditions (1), (2) and (3) as shown in the numerical data.

Figure 4:
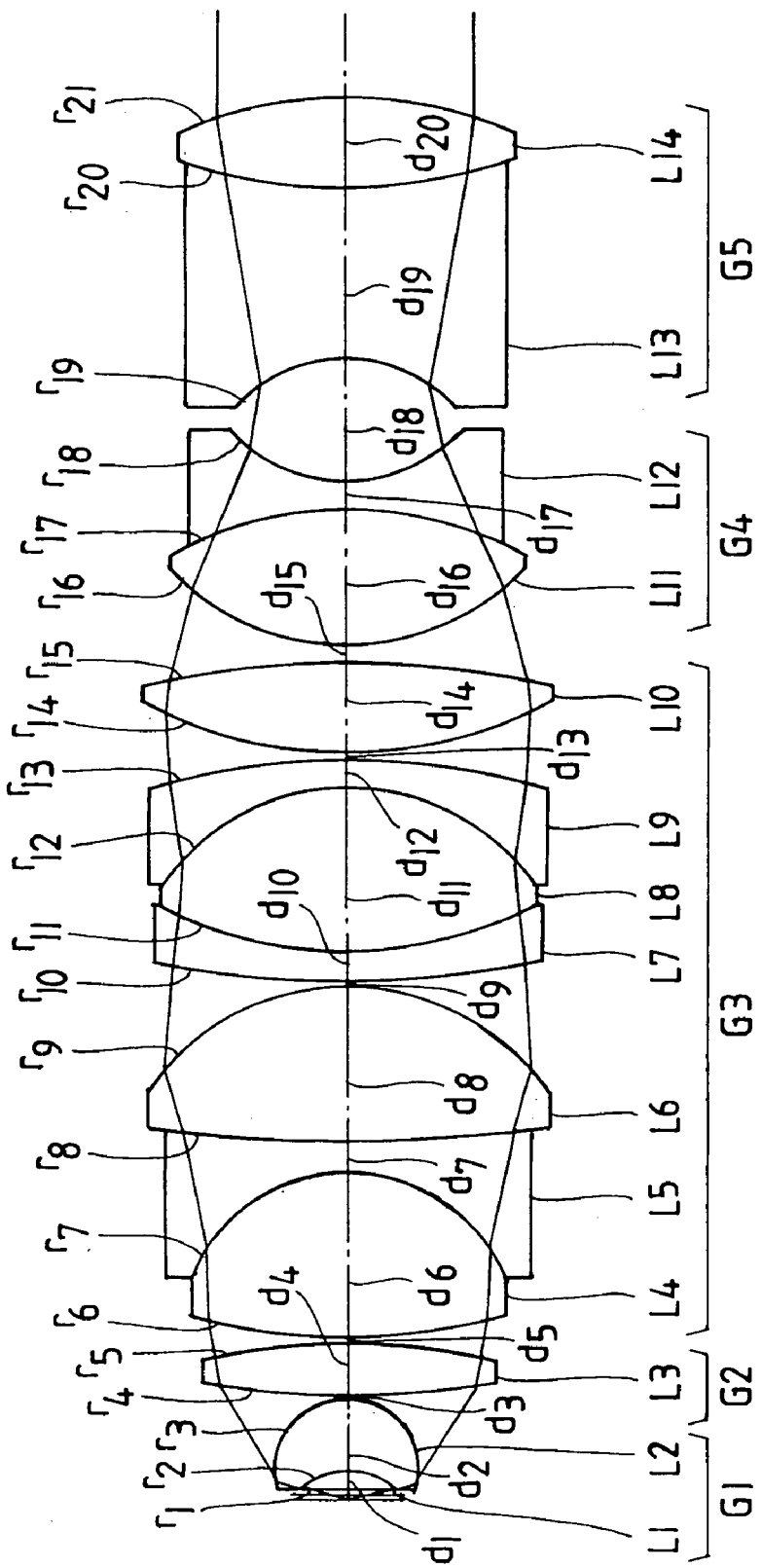
FIG. 4 is a sectional view of an objective lens system according to a fourth embodiment of the present invention.

An objective lens system according to the fourth embodiment of the present invention has a composition shown in FIG. 4 and numerical data which is listed below:

Magnification β = 60x, NA = 1.48, Field number 22, WD = 0.15

| | | | | |
|---|---|---|---|---|
| $r_1 = \infty$ | $d_1 = 0.6800$ | $n_1 = 1.51633$ | $v_1 = 64.14$ | L1 |
| $r_2 = -2.3456$ | $d_2 = 2.4611$ | $n_2 = 1.88300$ | $v_2 = 40.76$ | L2 |
| $r_3 = -2.4070$ | $d_3 = 0.1000$ | | | |
| $r_4 = 26.7849$ | $d_4 = 1.8000$ | $n_3 = 1.88300$ | $v_3 = 40.76$ | L3 |
| $r_5 = -23.2348$ | $d_5 = 0.2000$ | | | |
| $r_6 = 18.8405$ | $d_6 = 5.7745$ | $n_4 = 1.49700$ | $v_4 = 81.54$ | L4 |
| $r_7 = -5.7635$ | $d_7 = 1.0000$ | $n_5 = 1.73800$ | $v_5 = 32.26$ | L5 |
| $r_8 = 44.2904$ | $d_8 = 5.4936$ | $n_6 = 1.43875$ | $v_6 = 94.93$ | L6 |
| $r_9 = -8.1486$ | $d_9 = 0.2000$ | | | |
| $r_{10} = 33.5309$ | $d_{10} = 1.0000$ | $n_7 = 1.61336$ | $v_7 = 44.49$ | L7 |
| $r_{11} = 13.6060$ | $d_{11} = 5.7494$ | $n_8 = 1.43875$ | $v_8 = 94.93$ | L8 |
| $r_{12} = -7.6815$ | $d_{12} = 1.0000$ | $n_9 = 1.77250$ | $v_9 = 49.60$ | L9 |
| $r_{13} = -24.1850$ | $d_{13} = 0.2000$ | | | |
| $r_{14} = 14.7280$ | $d_{14} = 3.1664$ | $n_{10} = 1.43875$ | $v_{10} = 94.93$ | L10 |
| $r_{15} = -30.1450$ | $d_{15} = 0.6000$ | | | |
| $r_{16} = 8.2907$ | $d_{16} = 4.7445$ | $n_{11} = 1.60300$ | $v_{11} = 65.44$ | L11 |
| $r_{17} = -12.0370$ | $d_{17} = 1.0000$ | $n_{12} = 1.67300$ | $v_{12} = 38.15$ | L12 |
| $r_{18} = 5.3610$ | $d_{18} = 4.3186$ | | | |
| $r_{19} = -4.8977$ | $d_{19} = 5.8879$ | $n_{13} = 1.60300$ | $v_{13} = 65.44$ | L13 |
| $r_{20} = 16.9759$ | $d_{20} = 3.1640$ | $n_{14} = 1.72825$ | $v_{14} = 28.46$ | L14 |
| $r_{21} = -14.1543$ | | | | |

R12 = $r_2$ = −2.3456
R13 = $r_3$ = −2.407
f = 3
f12 = 2.8
f1 = 3.5
f2 = 14.33
f3 = 15.73
f4 = −39.64
f5 = −36.9
|f12/f| = 0.93          Condition (1)
|R12/R13| = |$r_2/r_3$| = 0.97   Condition (2)
|R12/f| = |$r_2/f$| = 0.78    Condition (3)

The objective lens system according to the fourth embodiment consists, as shown in the drawing, of a first lens unit G1, a second lens unit G2, a third lens unit G3, a fourth lens unit G4 and a fifth lens unit G5.

The first lens unit G1 is composed of a plano-convex cemented lens component L1, L2 ($r_1$ to $r_3$) which has a cemented surface ($r_2$) concave on the object side, the second lens unit G2 is composed of a positive lens element L3 ($r_4$ to $r_5$), the third lens unit G3 has positive refractive power as a whole and is composed of a cemented lens component L4, L5, L6 ($r_6$ to $r_9$) which consists of three convex, concave and convex lens elements, a cemented lens component L7, L8, L9 ($r_{10}$ to $r_{13}$) which consists of three concave, convex and concave lens elements and a positive lens element L10 ($r_{14}$ to $r_{15}$), the fourth lens unit G4 has negative refractive power as a whole and is composed of a cemented meniscus lens component L1, L12 ($r_{16}$ to $r_{18}$) which has a concave surface on the image side, and the fifth lens unit G5 has negative refractive power as a whole and is composed of a cemented meniscus lens component L13, L14 ($r_{19}$ to $r_{21}$) which has a concave surface on the object side.

The objective lens system according to the fourth embodiment also satisfies the conditions (1), (2) and (3) as shown in the above described numerical data.

An objective lens system according to the fifth embodiment of the present invention has a composition shown in FIG. 5 and numerical data which is listed below:

Magnification β = 60x, NA = 1.48, Field number 22, WD = 0.15

| | | | | |
|---|---|---|---|---|
| $r_1 = \infty$ | $d_1 = 0.8000$ | $n_1 = 1.51633$ | $v_1 = 64.14$ | L1 |
| $r_2 = -3.5871$ | $d_2 = 2.5787$ | $n_2 = 1.88300$ | $v_2 = 40.76$ | L2 |
| $r_3 = -2.6944$ | $d_3 = 0.1000$ | | | |
| $r_4 = 21.7926$ | $d_4 = 1.8000$ | $n_3 = 1.88300$ | $v_3 = 40.76$ | L3 |
| $r_5 = -47.1096$ | $d_5 = 0.2000$ | | | |
| $r_6 = 15.9174$ | $d_6 = 5.8105$ | $n_4 = 1.49700$ | $v_4 = 81.54$ | L4 |
| $r_7 = -7.0662$ | $d_7 = 1.0000$ | $n_5 = 1.73800$ | $v_5 = 32.26$ | L5 |
| $r_8 = 21.9651$ | $d_8 = 5.5975$ | $n_6 = 1.43875$ | $v_6 = 94.93$ | L6 |
| $r_9 = -9.0082$ | $d_9 = 0.2000$ | | | |
| $r_{10} = 17.1629$ | $d_{10} = 1.0000$ | $n_7 = 1.61336$ | $v_7 = 44.49$ | L7 |
| $r_{11} = 14.1749$ | $d_{11} = 6.3342$ | $n_8 = 1.43875$ | $v_8 = 94.93$ | L8 |
| $r_{12} = -7.7450$ | $d_{12} = 1.0000$ | $n_9 = 1.77250$ | $v_9 = 49.60$ | L9 |
| $r_{13} = -24.4287$ | $d_{13} = 0.2000$ | | | |
| $r_{14} = 13.0557$ | $d_{14} = 3.7780$ | $n_{10} = 1.43875$ | $v_{10} = 94.93$ | L10 |
| $r_{15} = -57.8878$ | $d_{15} = 0.6000$ | | | |
| $r_{16} = 8.7883$ | $d_{16} = 4.4483$ | $n_{11} = 1.60300$ | $v_{11} = 65.44$ | L11 |
| $r_{17} = -12.4876$ | $d_{17} = 1.0000$ | $n_{12} = 1.67300$ | $v_{12} = 38.15$ | L12 |
| $r_{18} = 4.8256$ | $d_{18} = 3.4411$ | | | |
| $r_{19} = -5.3141$ | $d_{19} = 5.1244$ | $n_{13} = 1.60300$ | $v_{13} = 65.44$ | L13 |
| $r_{20} = 18.2004$ | $d_{20} = 1.8273$ | $n_{14} = 1.76182$ | $v_{14} = 26.52$ | L14 |
| $r_{21} = -32.7452$ | $d_{21} = 0.2000$ | | | |
| $r_{22} = 68.0322$ | $d_{22} = 2.0000$ | $n_{15} = 1.71736$ | $v_{15} = 29.52$ | L15 |
| $r_{23} = -37.0389$ | | | | |

R12 = $r_2$ = −3.5871
R13 = $r_3$ = −2.6944
f = 3
f12 = 3.02
f1 = 3.68
f2 = 17.08
f3 = 13.97
f4 = −22.99
f5 = −45.58
|f12/f| = 1.01                                          Condition (1)
|R12/R13| = |$r_2/r_3$| = 1.33                          Condition (2)
|R12/f| = |$r_2/f$| = 1.2                               Condition (3)

Figure 5:
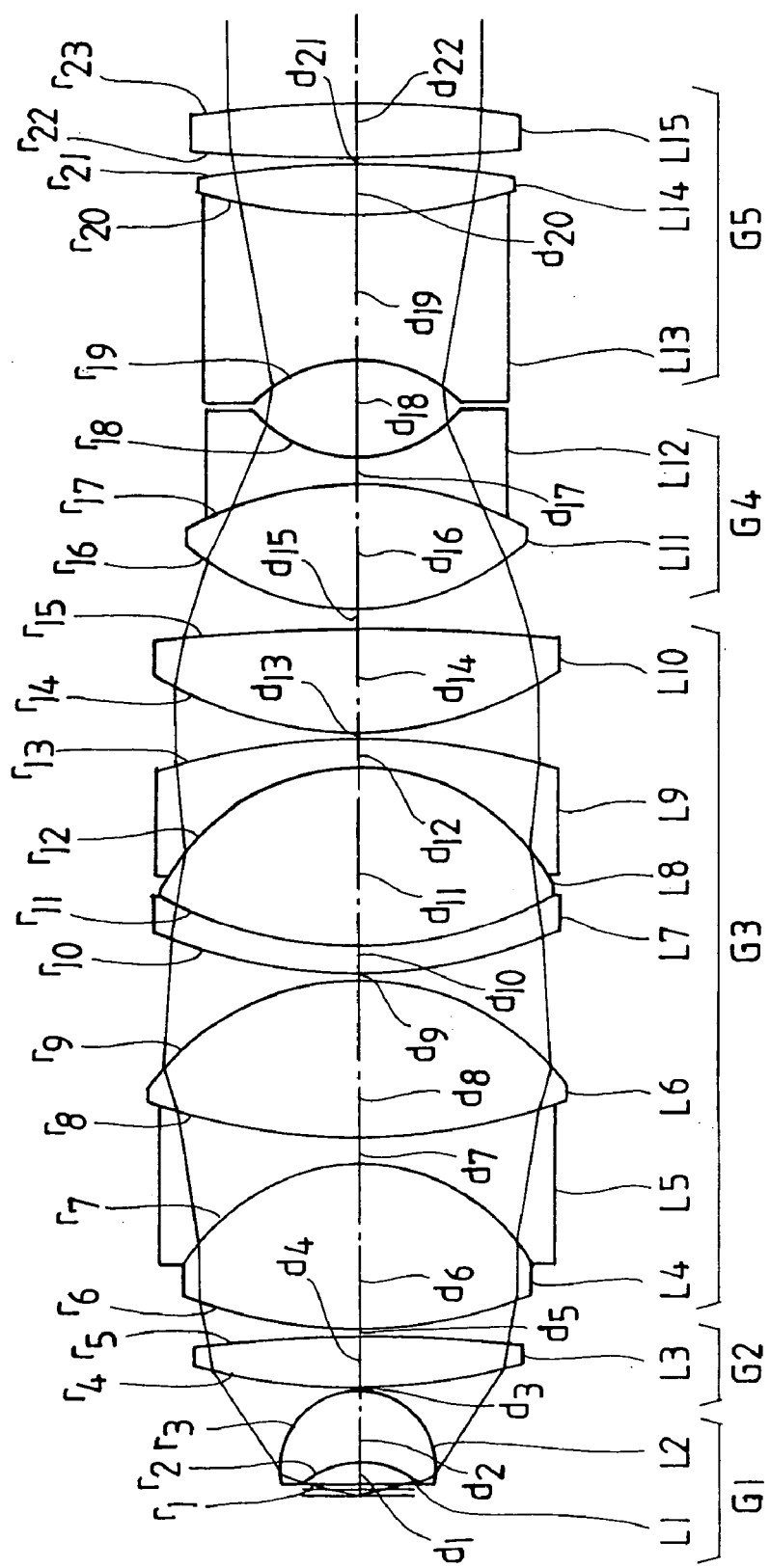
FIG. 5 is a sectional view of an objective lens system according to a fifth embodiment of the present invention.

The objective lens system according to the fifth embodiment consists, in order from the object side as shown in FIG. 5, of a first lens unit G1, a second lens unit G2, a third lens unit G3, a fourth lens unit G4 and a fifth lens unit G5.

The first lens unit G1 is composed of a plano convex cemented lens component L1, L2 ($r_1$ to $r_3$) which has a cemented surface ($r_2$) concave on the object side, the second lens unit G2 is composed of a positive lens element L3 ($r_4$ to $r_5$), the third lens unit G3 has positive refractive power as a whole and is composed of a cemented lens component L4, L5, L6 ($r_6$ to $r_9$) which consists of three concave, convex and concave lens elements, a cemented lens component L7, L8, L9 ($r_{10}$ to $r_{13}$) which consists of three concave, convex and concave lens elements and a positive lens element L10 ($r_{14}$ to $r_{15}$), the fourth lens unit G4 has negative refractive power as a whole and is composed of a cemented meniscus lens component L11, L12 ($r_{16}$ to $r_{18}$) which has a concave surface on the image side, and the fifth lens unit G5 has negative refractive power as a whole and is composed of a cemented meniscus lens component L13, L14 ($r_{19}$ to $r_{21}$) which has a concave surface on the object side and a positive lens element L15 ($r_{22}$ to $r_{23}$).

The objective lens system according to the fifth embodiment satisfies the conditions (1), (2) and (3) as shown in the numerical data.

Each of the first through fifth embodiments described above uses a cover glass plate and oil which are mentioned below:

Cover glass plate d=0.17 mm, nd=1.521, $v_d$=56
Oil nd=1.51548, $v_d$=43.1

An objective lens system which has a second composition according to the present invention consists, in order from the object side, of a first lens unit which is composed of a cemented lens component consisting of a plano-convex lens element and a meniscus lens element having a concave surface on the object side, and a meniscus lens element, a second lens unit which comprises a plurality of cemented lens components and has positive refractive power, a third lens unit which comprises a plurality of cemented meniscus lens components having concave surfaces on the image side, and a fourth lens unit which comprises a plurality of meniscus lens components having concave surfaces on the object side, and is characterized in that the third lens unit satisfies the following conditions (4), (5) and (6):

$$5 < f_3/f < 100 \tag{4}$$

$$n_d(n) - n_d(p) < 0.2 \tag{5}$$

$$v(p) - v(n) > 35 \tag{6}$$

wherein a reference symbol f represents a focal length of the objective lens system as a whole, a reference symbol $f_3$ designates a focal length of the third lens unit, reference symbols $n_d(n)$ and $n_d(p)$ denote refractive indices of a negative lens element and a positive lens element respectively of the plurality of cemented lens components in the third lens unit, and reference symbols v(p) and v(n) represents Abbe's number of the positive lens element and the negative lens element respectively of the plurality of cemented lens components in the third lens unit.

The immersion objective lens system for microscope which has the second composition according to the present invention has a composition in which the first lens unit is configured to have the cemented surface concave on the object side by disposing the plano convex lens element and the meniscus lens element having the concave surface on the object side in the first lens unit. Accordingly, the objective lens system according to the present invention can nearly satisfy the condition of aplanatism and is capable of suppressing production of spherical aberration and coma.

Furthermore, the objective lens system according to the present invention has a composition in which the second lens unit comprises the plurality of cemented lens components and has the positive refractive power.

It is required for fluorescence observation to observe fluorescence images at various wavelengths and chromatic aberration must therefore be corrected sufficiently in an objective lens system for microscope. Furthermore, it is difficult to correct chromatic aberration in an objective lens system which has a high magnification since such an objective lens system has a short focal length.

Through the objective lens system which has the second composition according to the present invention has a high magnification, this objective lens system is configured so as to be capable of correcting chromatic aberration by selecting the above described composition for the second lens unit.

Furthermore, the third lens unit of the objective lens system which has the second composition according to the present invention is configured so as to comprise the plurality of cemented lens components having the concave surfaces on the image side and have the positive refractive power as a whole.

An objective lens system which has a high magnification has a small exit pupil even when the lens system has a large numerical aperture.

The objective lens system which has the second composition according to the present invention is configured to be capable of leading rays which are raised due to a large numerical aperture to a small exit pupil by configuring the third lens unit so as to have the positive refractive power.

Unless the third lens unit is configured so as to have the positive refractive power, a front lens group (a first lens unit and a second lens unit) will have too strong refractive power and produce aberrations of higher orders. Furthermore, the third lens unit which comprises the plurality of the meniscus lens components makes it possible to minimize aberrations to be produced by the third lens unit. Furthermore, correction of chromatic aberration can be facilitated by configuring the meniscus lens components as the cemented lens components.

The third lens unit satisfies the above-mentioned conditions (4), (5) and (6).

Out of these conditions, the condition (4) defines a ratio between the focal length of the third lens unit and the focal length of the objective lens system as a whole and is required for obtaining a high magnification and a large numerical aperture.

If $f_3/f$ has a value which is smaller than a lower limit of 5 of the condition (4), it will be difficult to correct chromatic aberration favorably. If $f_3/f$ has a value which is larger than an upper limit of 100 of the condition (4), in contrast, the front group will have too strong refractive power and produce aberrations of higher order in too large amounts. Accordingly, it will be difficult to obtain a large numerical aperture.

Furthermore, the condition (5) defines a difference between refractive indices of the positive lens element and the negative lens element which compose each of the cemented lens components, and is required for configuring the third lens unit so as to have the positive refractive power.

If the condition (5) is not satisfied, it will be difficult to configure the third lens unit so as to have the positive refractive power.

Furthermore, the condition (6) defines a difference between the Abbe's numbers of the positive lens element and the negative lens element which compose the meniscus cemented lens component in the above described third lens unit, and is required for correcting chromatic aberration sufficiently favorably.

If the condition (6) is not satisfied, it will be difficult to correct chromatic aberration favorably.

Furthermore, the fourth lens unit of the objective lens system which has the second composition according to the present invention is configured so as to comprise the meniscus lens components having the concave surfaces on the object side. This configuration makes it easy to correct a Petzval's sum and lateral chromatic aberration for securing flatness of an image surface.

It is more desirable that the above described objective lens system for microscope which has the second composition according to the present invention to satisfy the following condition (7):

$$0.7 < R_1/R_2 < 2 \tag{7}$$

wherein reference symbols $R_1$ and $R_2$ represent radii of curvature on an object side surface and an image side surface respectively of the meniscus lens element having the concave surface on the object side in the first lens unit.

The condition (7) defines a ratio between the radius of curvature R1 on the cemented surface and the radius of curvature R2 on the image side surface (air contact surface) of the cemented lens component in first lens unit and is required for obtaining a large numerical aperture while suppressing production of aberrations.

If $R_1/R_2$ has a value which is smaller than a lower limit of 0.7 of the condition (7), the cemented lens component will have a long focal length, thereby making it difficult to capture rays having large numerical apertures. Moreover, it will be difficult to shorten a focal length of the lens component as a whole while suppressing production of aberrations. If $R_1/R_2$ has a value which is larger than an upper limit of 2 of the condition (7), in contrast, a radius of curvature will be small on the image side air contact surface of the above described cemented lens component, thereby allowing aberrations of higher orders to be produced.

It is preferable for the objective lens system for microscope which has the second composition according to the present invention to configure the second lens unit so as to comprise a cemented lens component which is movable along an optical axis and has weak negative refractive power, and configure this cemented lens component so as to satisfy the following condition (8):

$$|f(G_2A)/f| > 100 \tag{8}$$

wherein a reference symbol $f(G_2A)$ represents a focal length of the cemented lens component which is movable in the second lens unit.

By disposing a cemented lens component having negative refractive power in the second lens unit and moving this cemented lens component along the optical axis, it is possible to configure the objective lens system according to the present invention so as to minimize performance degradation which is to be caused by spherical aberration and other aberrations aggravated by changing a thickness of a cover glass plate. The condition (8) defines a focal length of the movable lens component which is to be used in such a case. If the condition (8) is not satisfied, aberrations will be produced by moving the above described cemented lens component having the negative refractive power.

The objective lens system which has the second composition according to the present invention which is configured as described above is usable as an excellent immersion objective lens system for microscope which permits observation of faint rays in observation of fine samples.

Description will be made of objective lens system for microscope which have second composition according to sixth and seventh embodiments of the present invention.

The objective lens system for microscope. according to the sixth embodiment has a composition shown in FIG. 6 and numerical data which is listed below.

| $\beta = -100x$, NA = 1.41, f = 1.8 mm, WD = 0.13 mm Thickness of cover glass = 0.17 | | | |
|---|---|---|---|
| $r_1 = \infty$ | $d_1 = 0.6$ | $n_1 = 1.51633$ | $v_1 = 64.14$ |
| $r_2 = -2.3056$ | $d_2 = 1.69$ | $n_2 = 1.77250$ | $v_2 = 49.60$ |
| $r_3 = -1.8319$ | $d_3 = 0.4937$ | | |
| $r_4 = -14.3487$ | $d_4 = 3.8685$ | $n_3 = 1.49700$ | $v_3 = 81.14$ |
| $r_5 = -5.1719$ | $d_5 = 0.9342$ | | |
| $r_6 = 9.0854$ | $d_6 = 5.2135$ | $n_4 = 1.43875$ | $v_4 = 94.93$ |
| $r_7 = -10.1831$ | $d_7 = 1.2562$ | $n_5 = 1.75500$ | $v_5 = 52.32$ |
| $r_8 = 12.185$ | $d_8 = 4.6807$ | $n_6 = 1.43875$ | $v_6 = 94.93$ |
| $r_9 = -9.4127$ | $d_9 = 0.7$ | | |
| $r_{10} = 29.7704$ | $d_{10} = 4.2461$ | $n_7 = 1.43875$ | $v_7 = 94.93$ |
| $r_{11} = -7.3237$ | $d_{11} = 1.0025$ | $n_8 = 1.75500$ | $v_8 = 52.32$ |
| $r_{12} = -25.5869$ | $d_{12} = 0.43$ | | |
| $r_{13} = 8.2025$ | $d_{13} = 7.121$ | $n_9 = 1.49700$ | $v_9 = 81.14$ |
| $r_{14} = -9.4148$ | $d_{14} = 1.3244$ | $n_{10} = 1.63775$ | $v_{10} = 42.41$ |
| $r_{15} = 45.7638$ | $d_{15} = 1.1811$ | | |
| $r_{16} = 5.881$ | $d_{16} = 5.0271$ | $n_{11} = 1.49700$ | $v_{11} = 81.14$ |
| $r_{17} = -6.5137$ | $d_{17} = 1$ | $n_{12} = 1.63775$ | $v_{12} = 42.41$ |
| $r_{18} = 2.6129$ | $d_{18} = 1.4279$ | | |

-continued

β = −100x, NA = 1.41, f = 1.8 mm, WD = 0.13 mm
Thickness of cover glass = 0.17

| | | | |
|---|---|---|---|
| $r_{19} = -1.9011$ | $d_{19} = 4.3439$ | $n_{13} = 1.51633$ | $\nu_{13} = 64.14$ |
| $r_{20} = 19.1455$ | $d_{20} = 2.5037$ | $n_{14} = 1.67300$ | $\nu_{14} = 38.15$ |
| $r_{21} = -6.6332$ | | | |

$R_1/R_2 = r_2/r_3 = 1.259$
$f_3/f = 23.027$
$n_d(n) - n_d(p) = n_{10} - n_9 = 0.15875$
$\nu(p) - \nu(n) = \nu_9 - \nu_{10} = 38.73$

The sixth embodiment of the present invention is a lens system which consists, in order from the object side, of a first lens unit G1 which is composed of a cemented lens component ($r_1$ to $r_3$) consisting of a plano-convex lens element ($r_1$ to $r_2$) and a meniscus lens element ($r_2$ to $r_3$) having a concave surface on the object side, and a meniscus lens component ($r_4$ to $r_5$), a second lens unit G2 which is composed of two cemented lens components, or a cemented lens component ($r_6$ to $r_9$) consisting of three lens elements and a cemented lens component ($R_{10}$ to $r_{12}$), a third lens unit G3 which is composed of two meniscus cemented lens components, or a cemented lens component ($r_{13}$ to $r_{15}$) and a cemented lens component ($r_{16}$ to $r_{18}$) which have concave surfaces on the image side, and a fourth lens unit G4 which is composed of a meniscus cemented lens component ($r_{19}$ to $r_{21}$) having a concave surface on the object side.

As understood from values which are listed in the numerical data as values of the items mentioned in the conditions (4) through (8), the objective lens system according to the sixth embodiment satisfies all the conditions (4) through (8).

Figure 6:
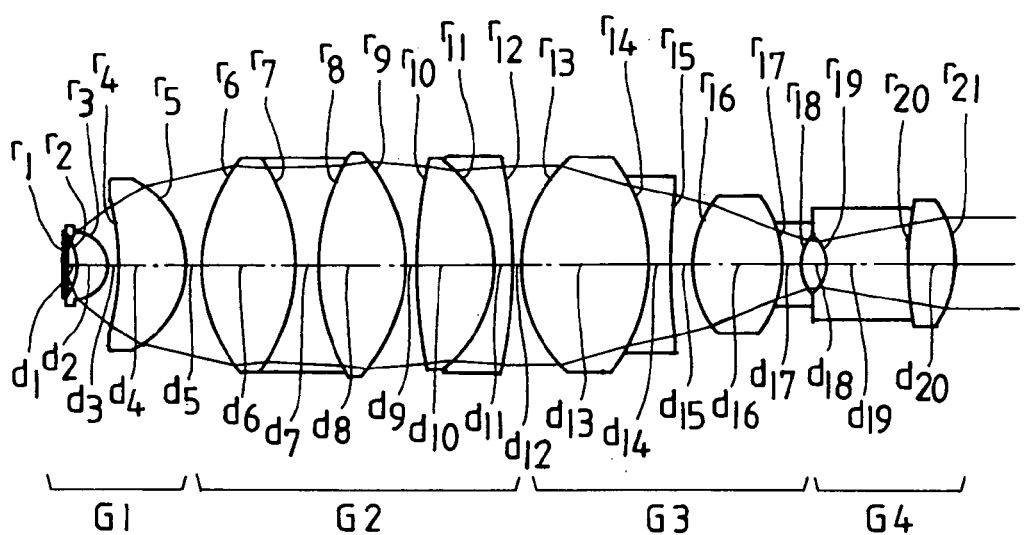
FIG. 6 is a sectional view showing a composition of an objective lens system according to a sixth embodiment of the present invention.
Figure 7:
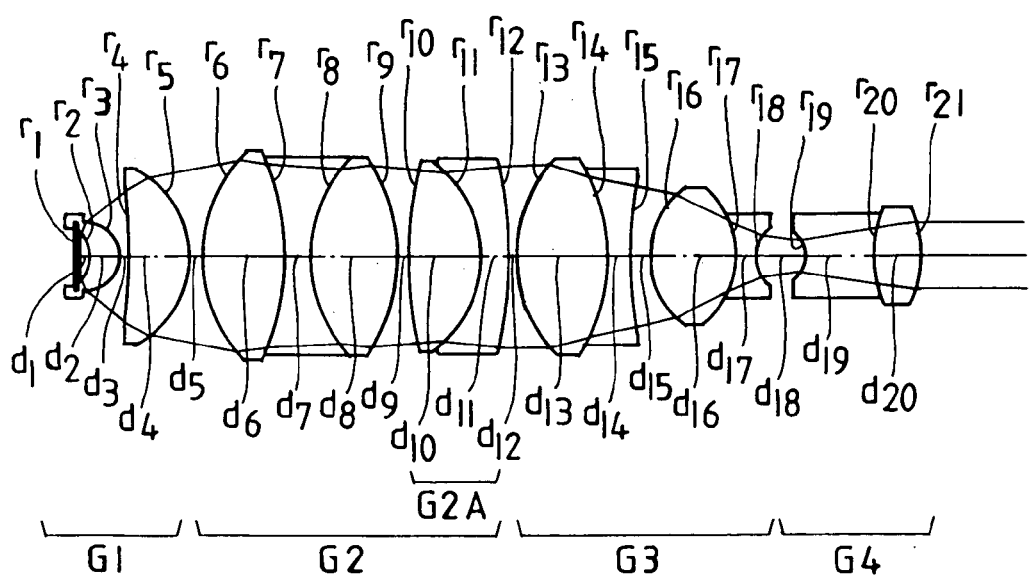
FIG. 7 is a sectional view showing a composition of an objective lens system according to a seventh embodiment of the present invention.
Figure 8:
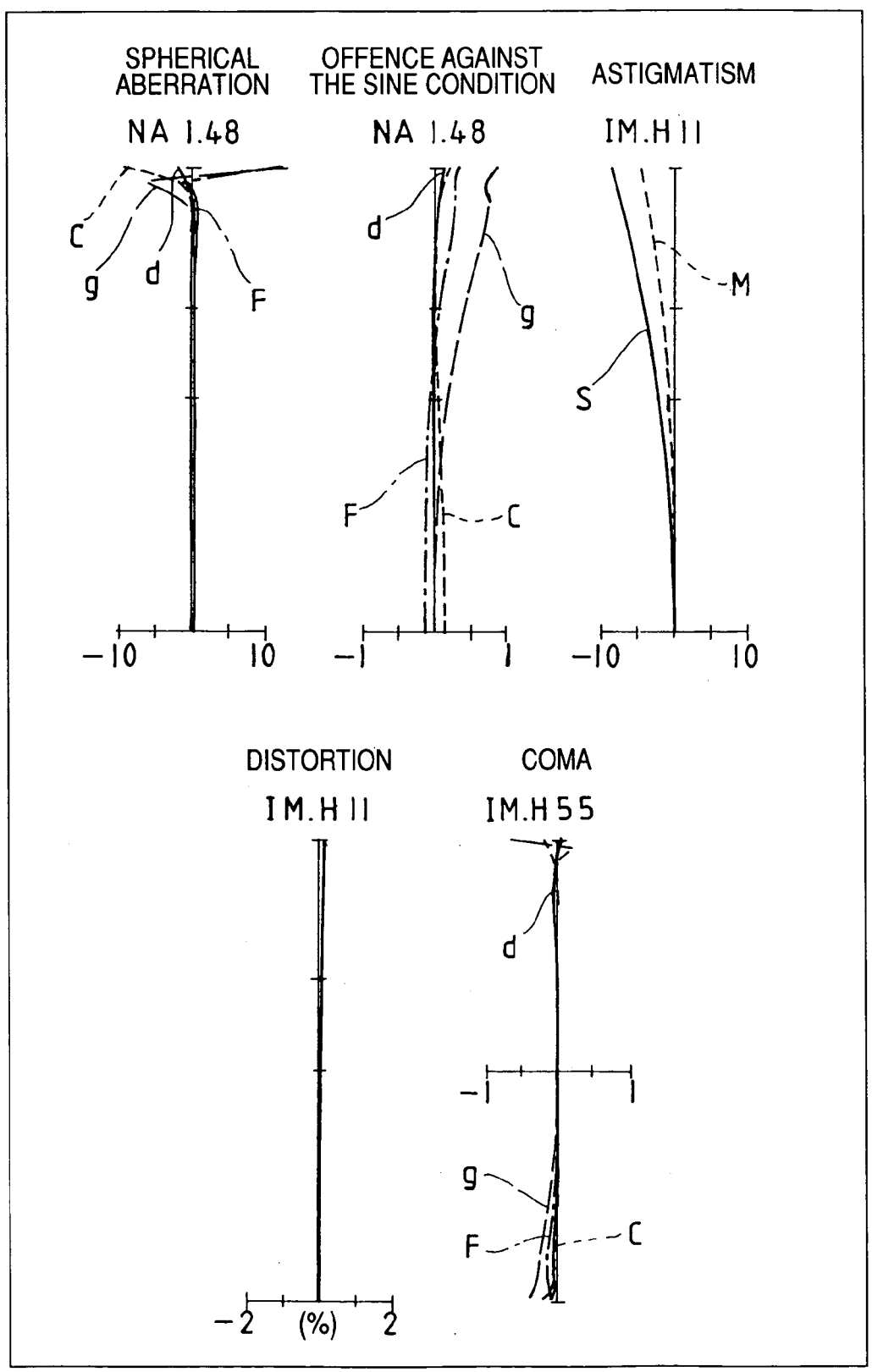
FIG. 8 shows aberration curves of the objective lens system according to the first embodiment of the present invention.
Figure 9:
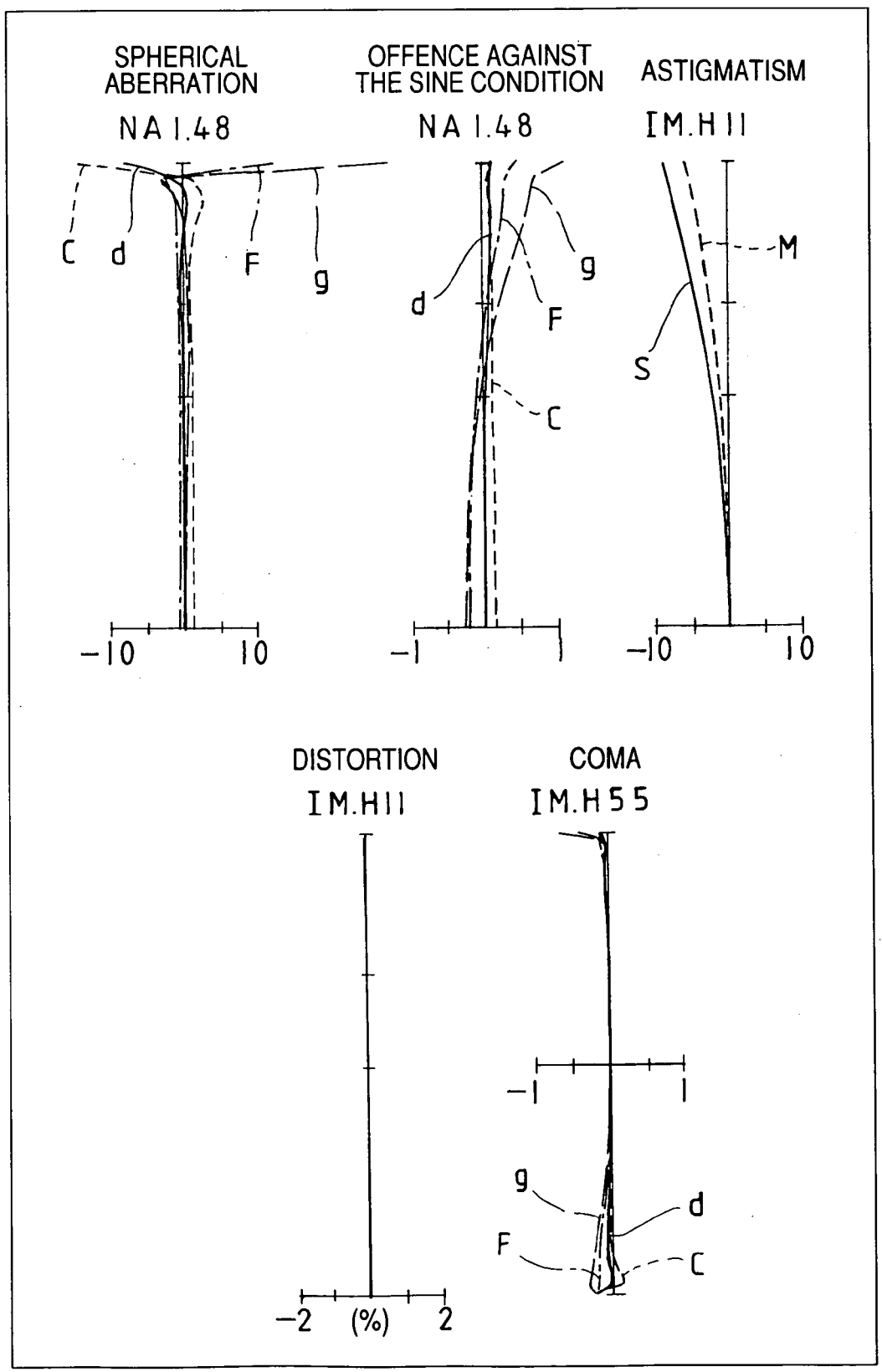
FIG. 9 shows aberration curves of the objective lens system according to the second embodiment of the present invention.
Figure 10:
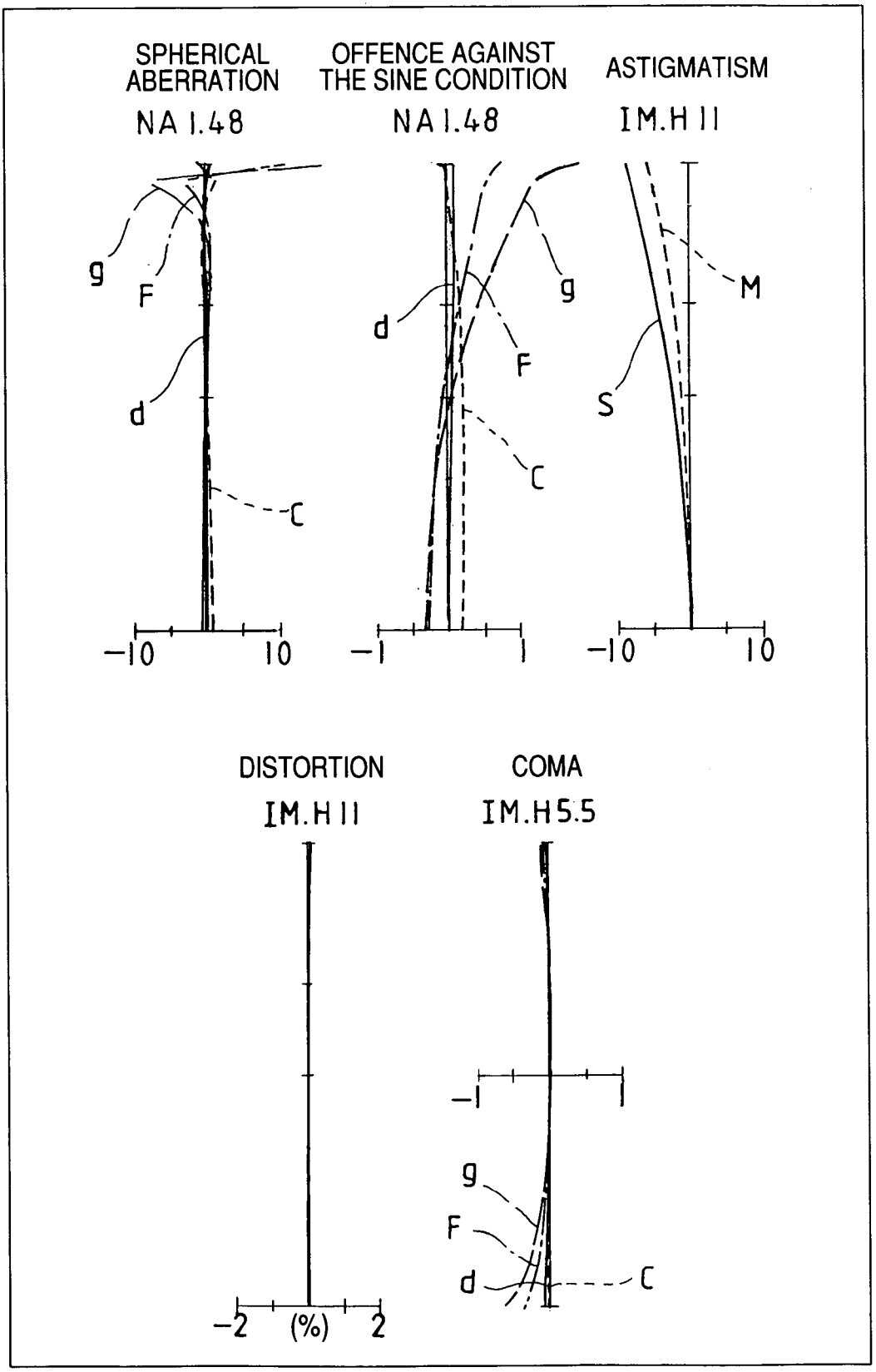
FIG. 10 shows aberration curves of the objective lens system according to the third embodiment of the present invention.
Figure 11:
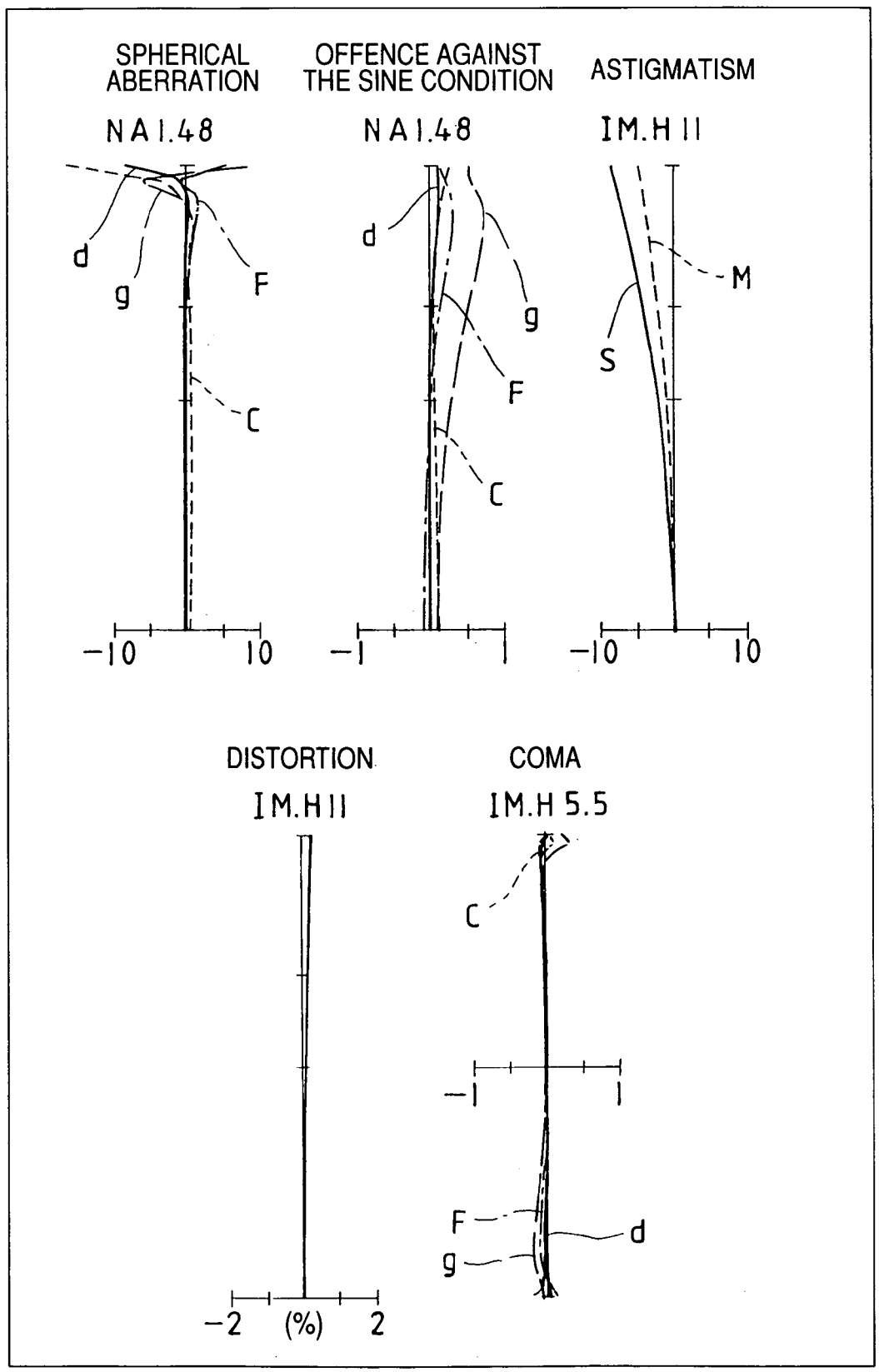
FIG. 11 shows aberration curves of the objective lens system according to the fourth embodiment of the present invention.
Figure 12:
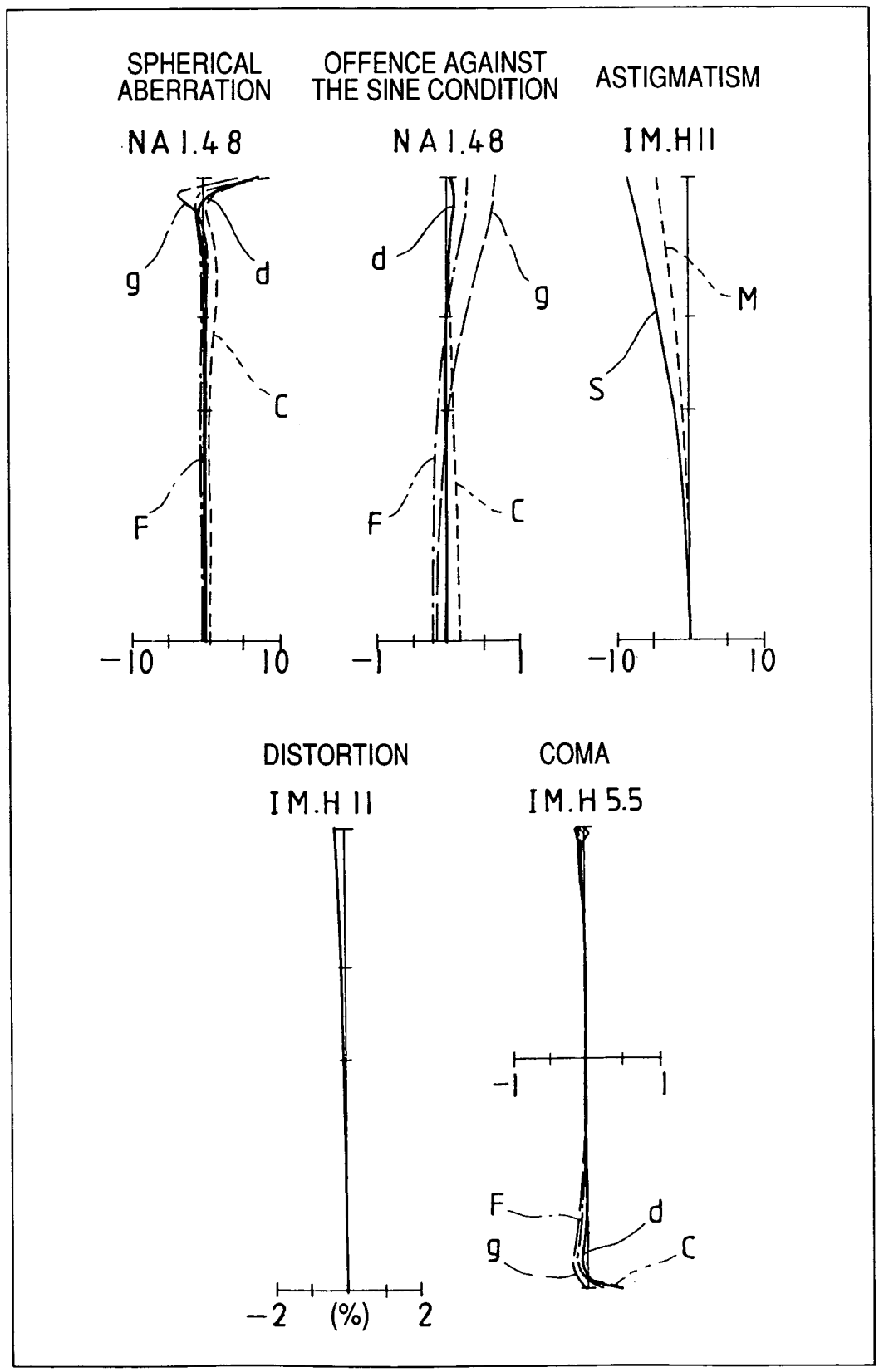
FIG. 12 shows aberration curves of the objective lens system according to the fifth embodiment of the present invention.

The seventh embodiment of the present invention has a composition shown in FIG. 7 which is similar to that of the sixth embodiment shown in FIG. 6.

The seventh embodiment has numerical data which is listed below:

β = −149.25x, NA = 1.45, f = 1.21 mm, WD = 0.13 mm
Thickness of cover glass = 0.13~0.21

| | | | |
|---|---|---|---|
| $r_1 = \infty$ | $d_1 = 0.6$ | $n_1 = 1.51633$ | $\nu_1 = 64.14$ |
| $r_2 = -1.609$ | $d_2 = 1.69$ | $n_2 = 1.77250$ | $\nu_2 = 49.60$ |
| $r_3 = -1.762$ | $d_3 = 0.4532$ | | |
| $r_4 = -31.9155$ | $d_4 = 3.5392$ | $n_3 = 1.49700$ | $\nu_3 = 81.14$ |
| $r_5 = -5.192$ | $d_5 = 0.6799$ | | |
| $r_6 = 7.6764$ | $d_6 = 4.6167$ | $n_4 = 1.43875$ | $\nu_4 = 94.93$ |
| $r_7 = -13.1802$ | $d_7 = 1.4689$ | $n_5 = 1.75500$ | $\nu_5 = 52.32$ |
| $r_8 = 7.7262$ | $d_8 = 4.6473$ | $n_6 = 1.43875$ | $\nu_6 = 94.93$ |
| $r_9 = -10.309$ | $d_9 = D1$ | | |
| $r_{10} = 22.6623$ | $d_{10} = 3.9663$ | $n_7 = 1.43875$ | $\nu_7 = 94.93$ |
| $r_{11} = -6.2339$ | $d_{11} = 1.4979$ | $n_8 = 1.75500$ | $\nu_8 = 52.32$ |
| $r_{12} = -24.3361$ | $d_{12} = D2$ | | |
| $r_{13} = 7.2943$ | $d_{13} = 5.1007$ | $n_9 = 1.49700$ | $\nu_9 = 81.14$ |
| $r_{14} = -9.591$ | $d_{14} = 1.4051$ | $n_{10} = 1.63775$ | $\nu_{10} = 42.41$ |
| $r_{15} = 26.999$ | $d_{15} = 1.0221$ | | |
| $r_{16} = 4.323$ | $d_{16} = 4.9786$ | $n_{11} = 1.49700$ | $\nu_{11} = 81.14$ |
| $r_{17} = -4.6361$ | $d_{17} = 1$ | $n_{12} = 1.63775$ | $\nu_{12} = 42.41$ |
| $r_{18} = 1.8523$ | $d_{18} = 2.8153$ | | |
| $r_{19} = -1.485$ | $d_{19} = 3.696$ | $n_{13} = 1.51633$ | $\nu_{13} = 64.14$ |
| $r_{20} = 7.7916$ | $d_{20} = 2.616$ | $n_{14} = 1.67300$ | $\nu_{14} = 38.15$ |
| $r_{21} = -6.193$ | | | |

Thickness of cover glass

| | 0.13 mm | 0.15 mm | 0.21 mm |
|---|---|---|---|
| D1 (variable) | 0.58515 | 0.7 | 0.81577 |
| D2 (variable) | 0.54485 | 0.43 | 0.31423 |

-continued

β = −149.25x, NA = 1.45, f = 1.21 mm, WD = 0.13 mm
Thickness of cover glass = 0.13~0.21

$R_1/R_2 = r_2/r_3 = 0.913$
$f_3/f = 22.132$
$n_d(n) - n_d(p) = n_{10} - n_9 = 0.15875$
$\nu(p) - \nu(n) = \nu_9 - \nu_{10} = 38.73$
$f(G_2A)/f = 4390$

The objective lens system according to the seventh embodiment also satisfies the conditions (4) through (8).

The seventh embodiment is configured to correct aggravation of aberrations is configured to correct aggravation of aberrations due to a change of a thickness of a cover glass plate by moving a cemented lens component G3A ($r_{10}$ to $r_{12}$) in a third lens unit, in other words, the seventh embodiment is configured to correct the aggravation of aberrations by moving the cemented lens component G3A so as to change spaces $d_9$ and $d_{12}$ reserved before and after this cemented lens component. Values of $d_9$ (=D1) and $d_{12}$ (=D2) for moving the cemented lens component to correct aberrations correspondingly to a thickness of the cover glass plate are specified in the numerical data.

Since the objective lens system for microscope which has the second composition according to the present invention is an immersion objective lens system for microscope, each of the objective lens systems according to the above described sixth and seventh embodiments uses a liquid having a refractive index of 1.51548 and an Abbe's number of 43.1, and a cover glass plate having a refractive index of 1.521 and an Abbe's number of 56.02 between an object surface and a first surface ($r_1$).

Figure 17:
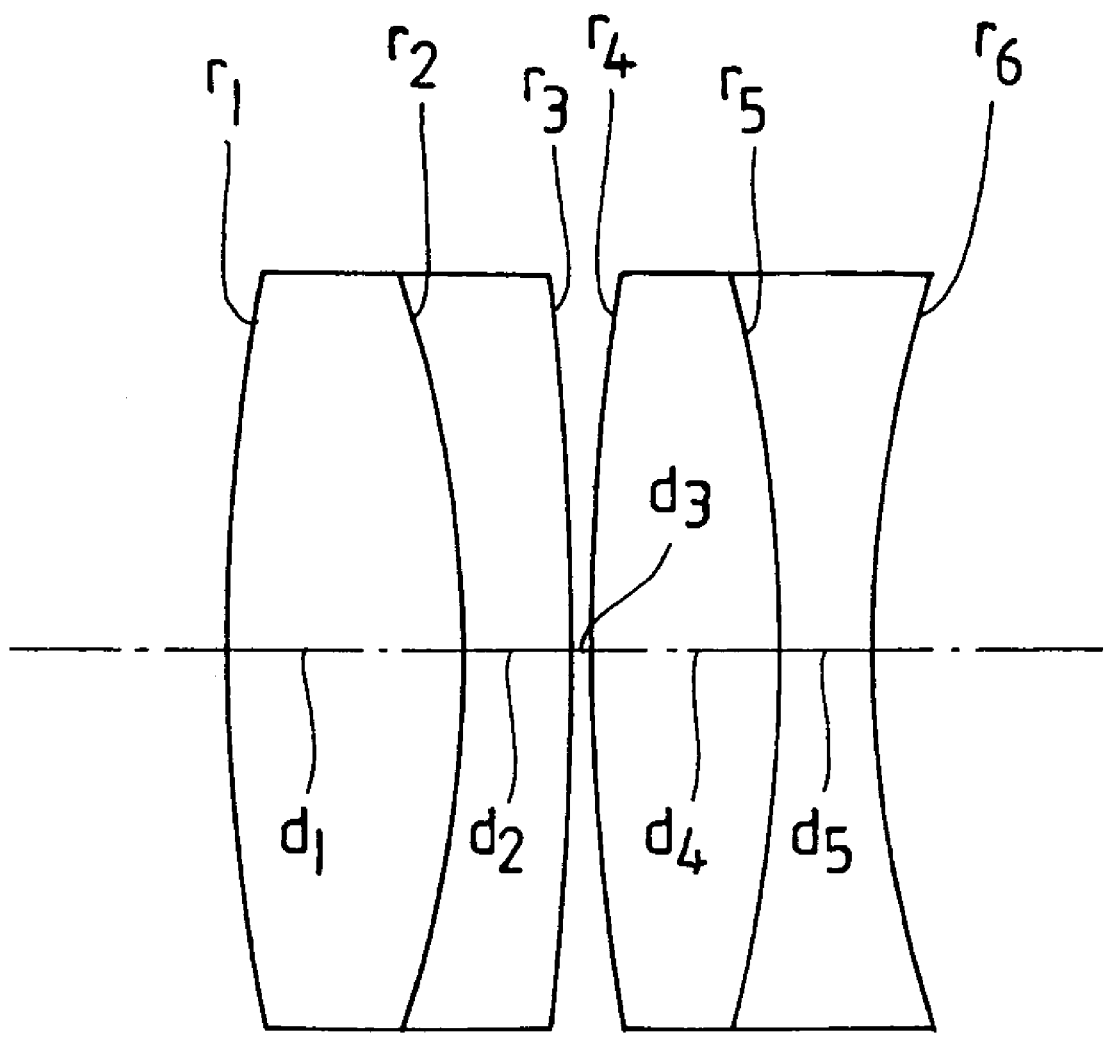
FIG. 17 is a sectional view showing a composition of an example of imaging lens system which is to be used in combination with the objective lens system according to the present invention.

Each of the objective lens systems according to the first through seventh embodiment of the present invention is an infinite correction type objective lens system from which a parallel light bundle emerges and does not form an image by the objective lens itself. The objective lens system is therefore used in combination, for example, with an imaging lens system which has a composition shown in FIG. 17 and numerical data listed below:

| | | | |
|---|---|---|---|
| F = 180 | | | |
| $r_1 = 68.7541$ | $d_1 = 7.7321$ | $n_1 = 1.48749$ | $\nu_1 = 70.20$ |
| $r_2 = -37.5679$ | $d_2 = 3.4742$ | $n_2 = 1.80610$ | $\nu_2 = 40.95$ |
| $r_3 = -102.8477$ | $d_3 = 0.6973$ | | |
| $r_4 = 84.3099$ | $d_4 = 6.0238$ | $n_3 = 1.83400$ | $\nu_3 = 37.16$ |
| $r_5 = -50.7100$ | $d_5 = 3.0298$ | $n_4 = 1.64450$ | $\nu_4 = 40.82$ |
| $r_6 = -40.6619$ | | | | wherein reference symbols $r_1, r_2 \ldots r_6$ represent radii of curvature on respective lens element of the imaging lens system, reference symbols $d_1, d_2, \ldots, d_5$ designate thicknesses of the respective lens element of the imaging lens system and airspaces reserved therebetween, reference symbols $n_1, n_2, n_3$ and $n_4$ denote refractive indices of the respective lens elements, reference symbols $\nu_1, \nu_2, \nu_3$ and $\nu_4$ represent Abbe's numbers of the respective lens elements, and a reference symbol F designates a focal length of the imaging lens system.

This imaging lens system has a focal length F=180 and is to be disposed at a distance of 50 mm to 170 mm as measured from the objective lens system (according to each embodiment) for use in combination with the objective lens system.

FIG. 8, FIG. 9, FIG. 10, FIG. 11 and FIG. 12 show aberration curves obtained in conditions where the objective lens systems according to the first through fifth embodiments are combined with the imaging lens system (with a distance of 120 mm reserved between the objective lens system and the imaging lens system).

As seen from these aberration curves, spherical aberration, chromatic aberration and the like are favorably corrected in all the embodiments.

Figure 13:
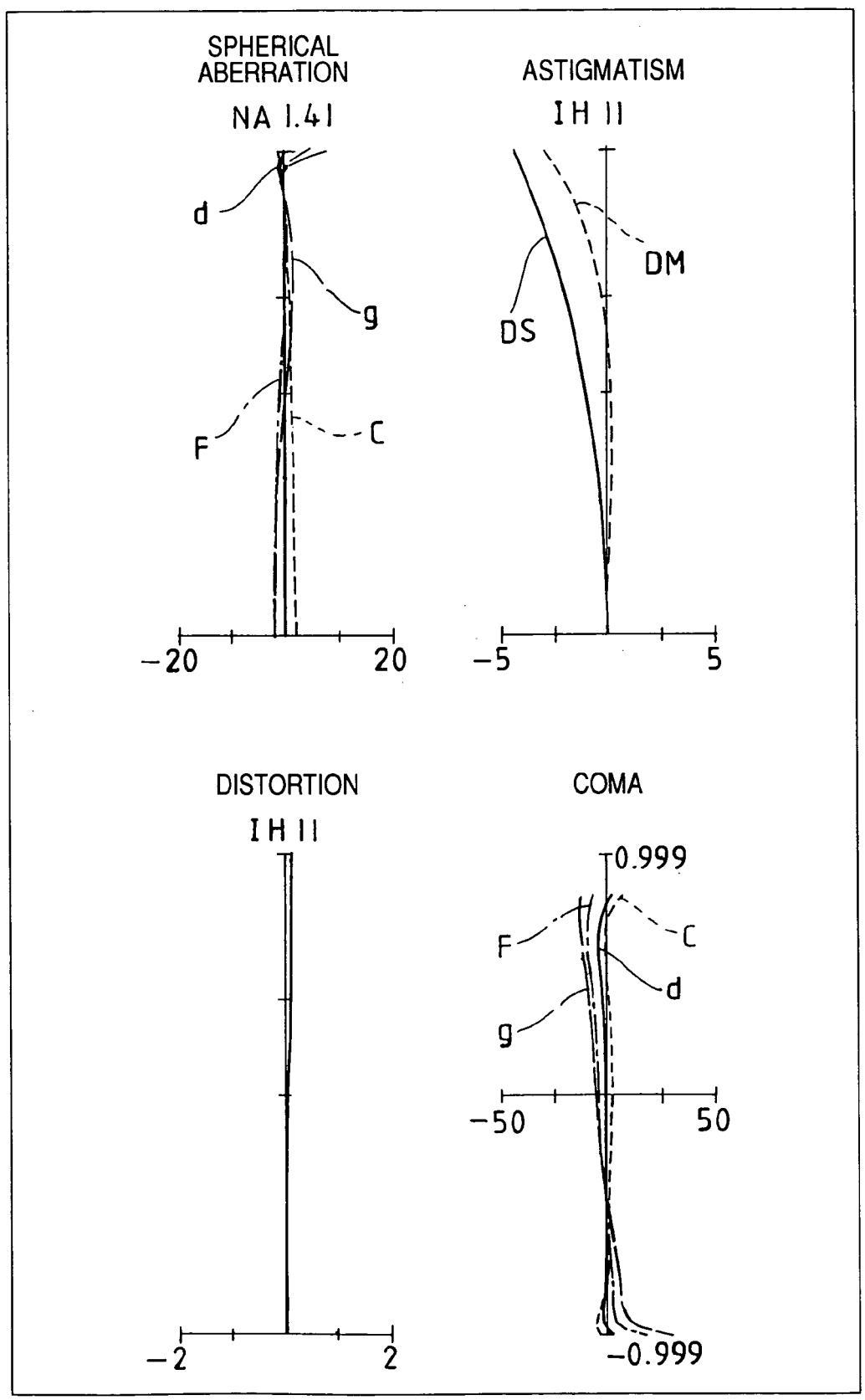
FIG. 13 shows aberration curves of the objective lens system according to the sixth embodiment of the present invention.

Furthermore, FIG. 13 shows aberration curves in a condition where the objective lens system according to the sixth embodiment is combined with the imaging lens system.

Figure 14:
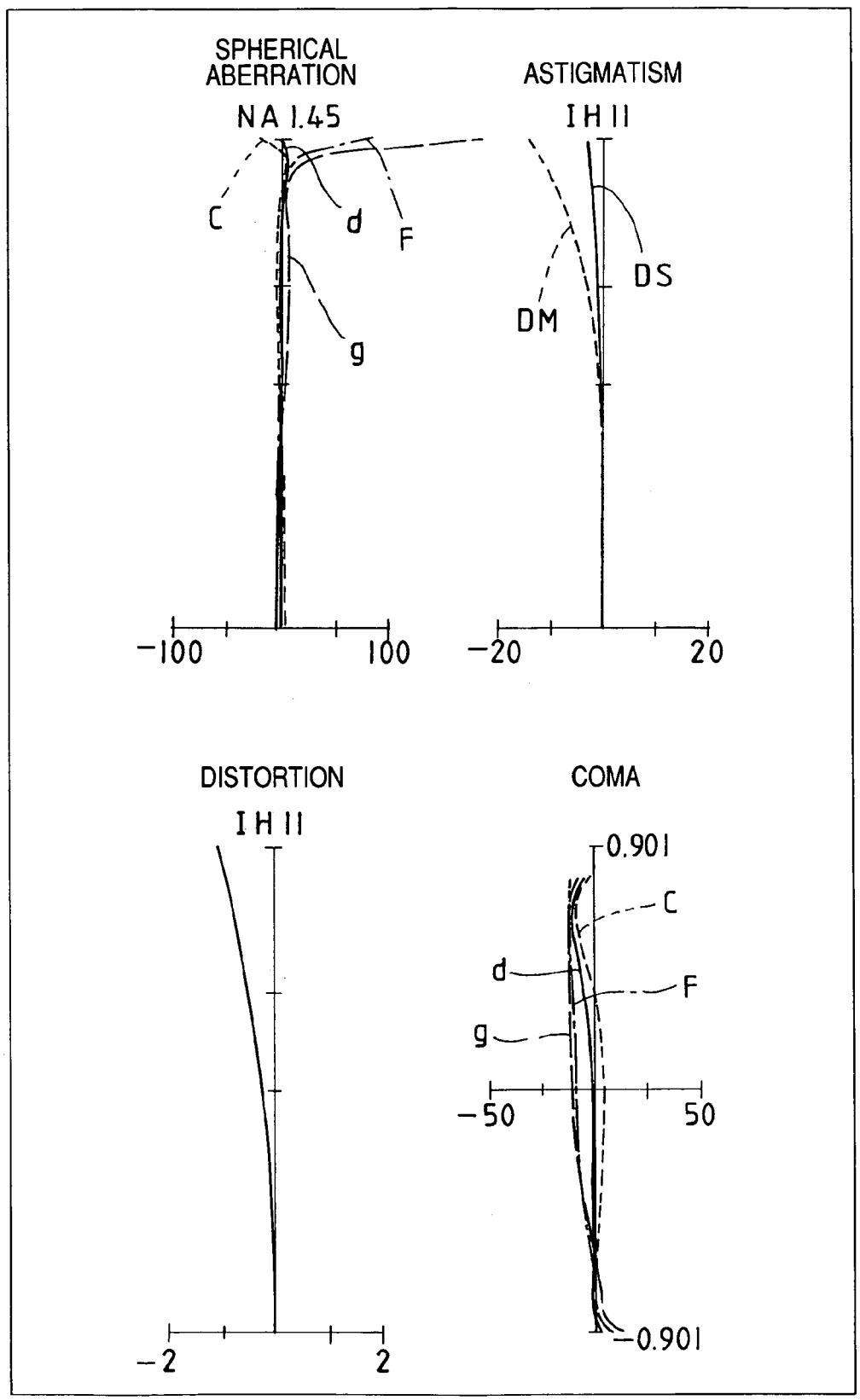
FIG. 14 shows aberration curves of the objective lens system according to the seventh embodiment of the present invention which uses a cover glass plate 0.13 mm thick.
Figure 15:
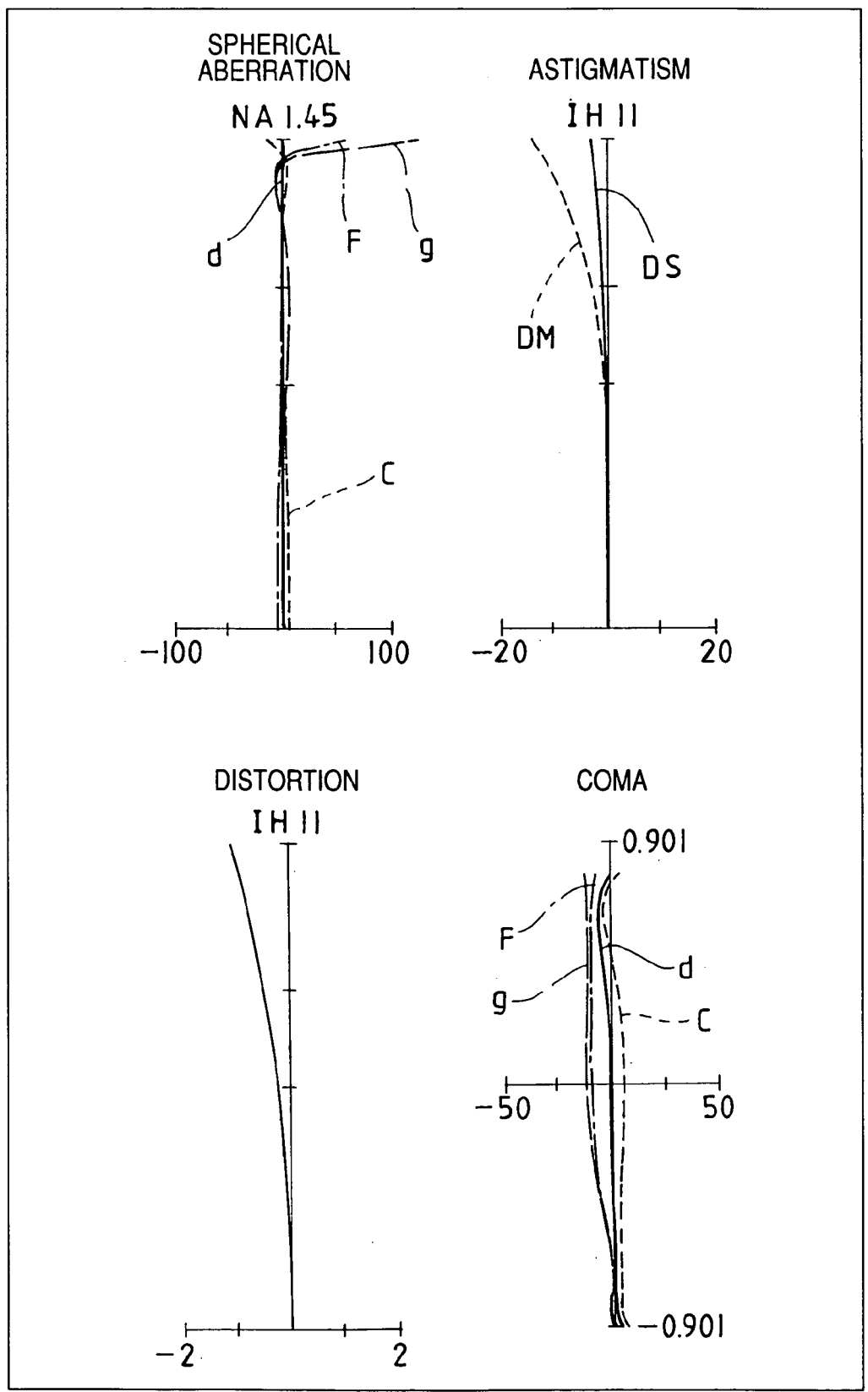
FIG. 15 shows aberration curves of the objective lens system according to the seventh embodiment of the present invention which uses a cover glass plate 0.17 mm thick.
Figure 16:
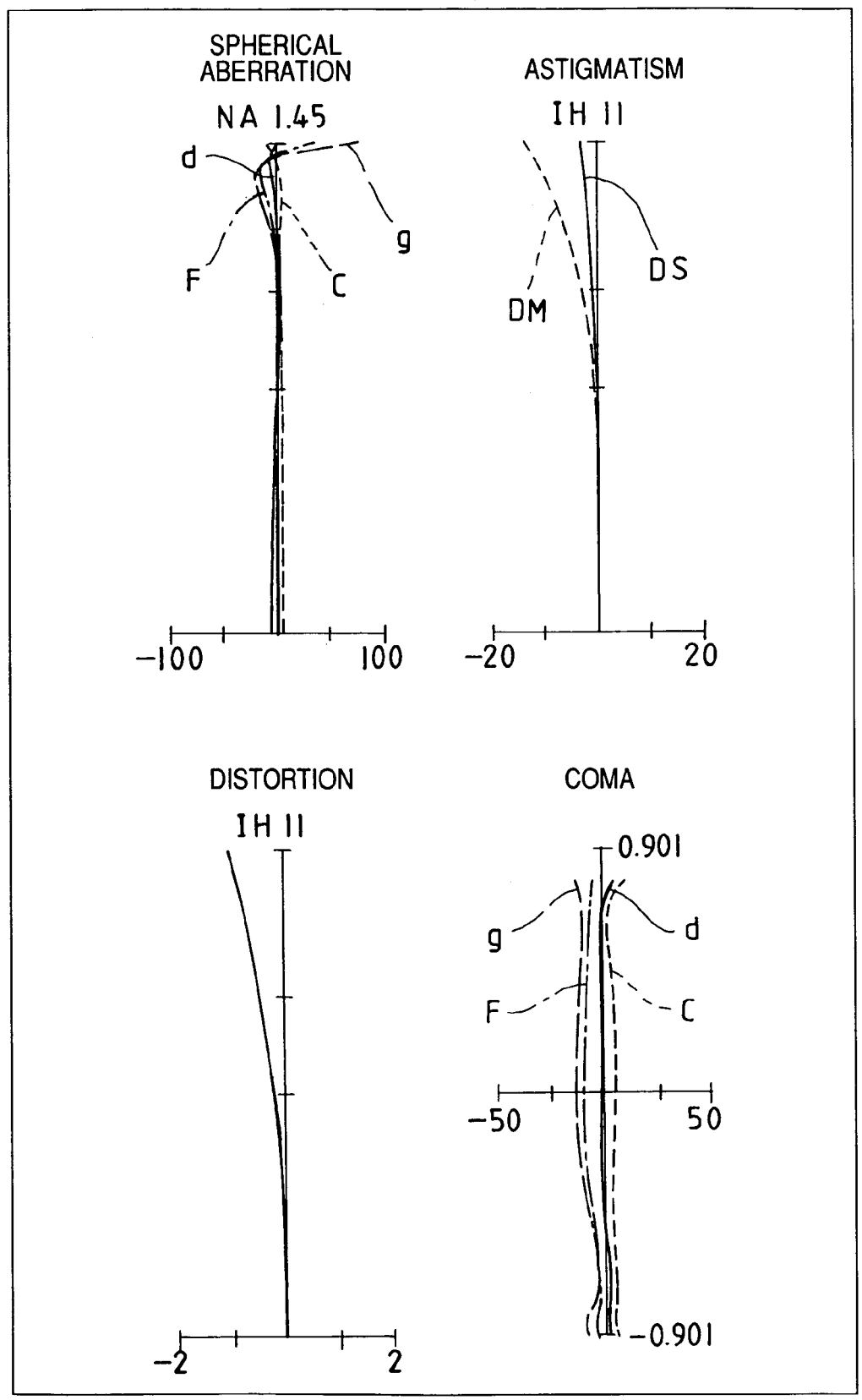
FIG. 16 shows aberration curves of the objective lens system according to the seventh embodiment of the present invention which uses a cover glass plate 0.21 mm thick.

Furthermore, FIG. 14, FIG. 15 and FIG. 16 shows aberration curves obtained in a condition where the objective lens system according to the seventh embodiment is combined with the imaging lens system. Out of these drawings, FIG. 14 shows aberration curves obtained with a cover glass plate 0.13 mm thick, FIG. 15 shows aberration curves obtained with a cover glass plate 0.17 mm thick and FIG. 16 shows aberration curves obtained with a cover glass plate 0.21 mm thick. A reference symbol IH represents an image height.

As apparent from these aberration curves,. aberrations are favorably corrected in the sixth and seventh embodiments.

The immersion objective lens system for microscope which has the first composition according to the present invention has a large numerical aperture NA exceeding 1.46 and favorably corrected spherical aberration and chromatic aberration even when standard oil and a standard cover glass plate are used instead of special oil and a special cover glass plate.

Furthermore, the immersion objective lens system which has the second composition according to the present invention has a large numerical aperture and a high magnification, therefore being usable as an objective lens system for a microscope which uses evanescent illumination and permitting favorable observation of a fine specimen.

The invention claimed is:

1. An immersion objective lens system for microscope which consists, in order from the object side, of a first lens unit composed of a cemented lens component consisting of a plano-convex lens element having a planar surface on the object side and a meniscus lens element having a concave surface on the object side, a second lens unit composed of a lens component or two lens components, a third lens unit comprising at least two cemented lens components, a fourth lens unit comprising a meniscus lens component having a strongly concave surface on the image side, and a fifth lens unit comprising a meniscus lens component having a concave surface on the object side, and satisfies the following condition (1):

$$0.9 \leq |f12/f| \leq 1.3 \quad (1)$$

wherein a reference symbol f12 represents a total focal length of the first lens unit and the second lens unit, and a reference symbol f designates a focal length of the objective lens system as a whole.

2. The immersion objective lens system for microscope according to claim 1, satisfying the following conditions (2) and (3):

$$0.7 \leq |R12/R13| \leq 1.4 \quad (2)$$

$$0.7 \leq |R12/f| \leq 1.3 \quad (3)$$

wherein a reference symbol R12 represents a radius of curvature on a cemented surface in the first lens unit, a reference symbol R13 designates a radius of curvature on an image side surface of the first lens unit and a reference symbol f denotes a focal length of the objective lens system as a whole.

3. An objective lens system for microscope which consists, in order from the object side, of a first lens unit composed of a cemented meniscus lens component consisting of a plano-convex lens element and a meniscus lens element having a concave surface on the object side, a second lens unit comprising a plurality of cemented lens components and having positive refractive power, a third lens unit comprising a plurality of cemented meniscus lens components having concave surfaces on the image side and having positive refractive power, and a fourth lens unit comprising a meniscus lens component having a concave surface or more meniscus lens components having concaves surfaces on the object side, and satisfies the following conditions (4), (5) and (6):

$$5 < f_3/f < 100 \quad (4)$$

$$n_d(n) - n_d(p) < 0.2 \quad (5)$$

$$v(p) - v(n) > 35 \quad (6)$$

wherein a reference symbol $f_3$ represents a focal length of the third lens unit, a reference symbol f designates a focal length of the objective lens system as a whole, reference symbols $n_d(n)$ and $n_d(p)$ denote refractive indices of a negative lens element and a positive lens element respectively which compose each of the cemented lens components in the third lens unit, and reference symbols $v(p)$ and $v(n)$ represent Abbe's numbers of the positive lens element and the negative lens element respectively which compose each of the cemented lens components in the third lens unit.

4. The objective lens system for microscope according to claim 3, satisfying the following condition (7):

$$0.7 < R_1/R_2 < 2 \quad (7)$$

wherein reference symbols $R_1$ and $R_2$ represent radii of curvature on an object side surface and an image side surface respectively of the meniscus cemented lens component having the concave surface on the object side in the first lens unit.

5. The objective lens system for microscope according to claim 3, comprising a cemented lens component movable along an optical axis and having weak negative refractive power in said second lens unit, and satisfying the following condition (8):

$$|f(G_2A)/f| > 100 \quad (8)$$

wherein a reference symbol $f(G_2A)$ represents a focal length of said lens component movable in the second lens unit.

* * * * *